United States Patent
Abraham et al.

(10) Patent No.: US 12,258,471 B2
(45) Date of Patent: Mar. 25, 2025

(54) READILY PROCESS-ABLE, OIL-RESISTANT THERMOPLASTIC VULCANIZATES

(71) Applicant: Parker-Hannifin Corporation, Cleveland, OH (US)

(72) Inventors: Tonson Abraham, Avon, OH (US); Aditya Jindal, Cuyahoga Falls, OH (US); Michael P. Mallamaci, North Canton, OH (US); Taylor L. Wilson, Valley View, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 180 days.

(21) Appl. No.: 17/374,395

(22) Filed: Jul. 13, 2021

(65) Prior Publication Data
US 2022/0195184 A1 Jun. 23, 2022

Related U.S. Application Data

(60) Provisional application No. 63/128,354, filed on Dec. 21, 2020.

(51) Int. Cl.
*C08L 77/02* (2006.01)
*C08L 13/00* (2006.01)
*C08L 67/03* (2006.01)

(52) U.S. Cl.
CPC .............. *C08L 77/02* (2013.01); *C08L 13/00* (2013.01); *C08L 67/03* (2013.01); *C08L 2207/04* (2013.01); *C08L 2312/00* (2013.01)

(58) Field of Classification Search
CPC ...... C08L 13/00; C08L 9/02; C08L 67/00–08; C08L 2207/04; C08L 2312/00; C08L 67/025; C08L 67/03; C08J 2313/00; C08J 2367/02; C08J 2377/02; C08J 2409/02; C08J 2413/00; C08J 2467/02; C08J 2477/02; C08J 3/246
See application file for complete search history.

(56) References Cited

U.S. PATENT DOCUMENTS

| | | | |
|---|---|---|---|
| 4,508,867 A * | 4/1985 | Sato | C08L 13/00 524/514 |
| 5,591,798 A | 1/1997 | Patel | |
| 5,942,577 A | 8/1999 | Venkataswamy | |
| 6,005,052 A | 12/1999 | Venkataswamy et al. | |
| 6,013,715 A | 1/2000 | Gornowicz et al. | |
| 6,020,427 A * | 2/2000 | Abraham | C08L 13/00 525/166 |
| 6,207,752 B1 | 3/2001 | Abraham et al. | |
| 6,329,463 B1 | 12/2001 | Abraham et al. | |
| 6,624,251 B1 | 9/2003 | Chmielewski | |
| 7,244,790 B2 | 7/2007 | Sunkara et al. | |
| 7,291,667 B2 | 11/2007 | Nasreddine et al. | |
| 7,659,339 B2 | 2/2010 | Nasreddine et al. | |
| 2004/0115450 A1 | 6/2004 | Bendler et al. | |
| 2010/0160565 A1 | 6/2010 | Wu et al. | |
| 2016/0289410 A1* | 10/2016 | Yamaguchi | C08L 23/12 |
| 2017/0253684 A1* | 9/2017 | Fukumine | C08F 236/06 |

FOREIGN PATENT DOCUMENTS

| | | |
|---|---|---|
| EP | 0965607 B1 | 12/1999 |
| JP | H09227753 A * | 9/1997 |

OTHER PUBLICATIONS

JP H09227753 A (Sep. 2, 1997) machine translation.*

* cited by examiner

*Primary Examiner* — Ana L. Woodward
(74) *Attorney, Agent, or Firm* — McDonnell Boehnen Hulbert & Berghoff LLP

(57) ABSTRACT

Disclosed are thermoplastic vulcanizates comprising a plastic phase and a rubber phase and process for preparing such thermoplastic vulcanizates, wherein the plastic phase comprises a thermoplastic polymer and the rubber phase comprises a carboxylated nitrile rubber.

20 Claims, 1 Drawing Sheet

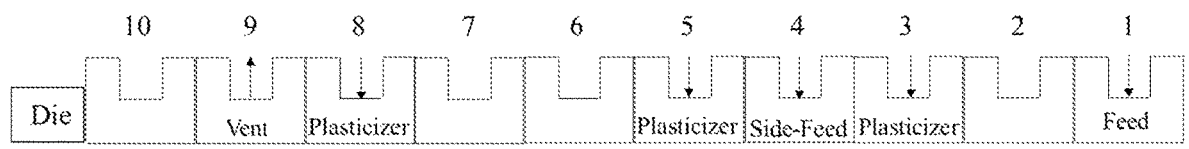

READILY PROCESS-ABLE, OIL-RESISTANT THERMOPLASTIC VULCANIZATES

CROSS-REFERENCE TO RELATED APPLICATIONS

This application claims priority from U.S. Provisional Application No. 63/128,354, filed Dec. 21, 2020, the disclosure of which is hereby incorporated by reference in its entirety.

FIELD

The present invention discloses compositions and methods for the preparation of thermoplastic vulcanizates (TPVs) that are resistant to hydrocarbon oils, by the dynamic vulcanization of carboxylated nitrile rubber (XNBR) in high melting point, semi-crystalline thermoplastic materials, namely, polyesters and nylons. The compositions of this invention can be readily produced and fabricated using commercially suitable plastics compounding and fabricating equipment to yield molded (by injection, extrusion or blow molding) parts with excellent surface appearance. Furthermore, addition-type curing agents that advantageously cure the rubber without the evolution of volatiles, without degradation of the plastic phase, and that facilitate rubber and plastic compatibilization, are disclosed.

BACKGROUND

The preparation of thermoplastic elastomers by dynamic vulcanization, i.e., thermoplastic vulcanizates (TPVs), although established over four decades ago, is still commercially viable with the use of only one plastic and rubber melt blend, namely isotactic polypropylene (PP) and ethylene/propylene/diene (EPDM) rubber.

Oil-resistant TPVs are used to manufacture a variety of products, such as, for example, gaskets, tubes, hoses, and seals. Current oil-resistant TPVs employ semi-crystalline polar plastic materials such as polyesters, nylons, and thermoplastic polyurethanes in combination with polar rubbers that are resistant to hydrocarbon oils, such as, include nitrile/butadiene rubber (NBR), hydrogenated nitrile-butadiene rubber (HNBR), and ethylene/acrylate rubber (AEM).

The molecular weight of commercially available HNBR is much lower than that of EPDM. Also, the EPDM polymer chains have a much larger aspect ratio (polymer length scale/chain thickness) than that of HNBR. Hence the EPDM chains entangle after a much shorter chain length than HNBR, allowing a higher density of trapped entanglements between cross-links than HNBR. This fact and the much higher MW of EPDM than HNBR allows rapid curing of the former rubber in the dynamic vulcanization process. A short cure time is essential in dynamic vulcanization.

The molecular weight (MW) of condensation polymers such as poly (butylene terephthalate) (PBT) is much lower than that of PP used in the preparation of PP/EPDM TPVs (PBT: weight average molecular weight ($M_w$): about 100,000 g/mol, number average molecular weight ($M_n$): about 50,000 g/mol; PP: weight average molecular weight ($M_w$): about 588,150 g/mol, number average molecular weight ($M_n$): about 119,000 g/mol). The aspect ratio of the PP chains is much higher than that of PBT chains and, hence at the interphase between the PP and EPDM phases, the PP and EPDM rubber are more entangled in PP/EPDM TPVs than in PBT/HNBR systems. As a result, there is poor "mechanical lock" in PBT/HNBR TPVs compared to PP/EPDM TPVs. The poor adhesion between these polar phases is typically improved using compatibilizer materials.

The rubber phase of the TPV has to be cured using a curative that does not affect the plastic phase. In the case of PP/EPDM TPVs, cure can be carried out by decomposition of a resole type of phenolic resin that is accelerated by the use of acidic promoters such as stannous chloride. This generates a quinonemethide intermediate which cures the rubber without affecting PP. However, this curing technology adversely effects polar plastic-based TPVs, as acidic materials are polar plastic pro-degradants. Thus, resole phenolic resin rubber cure systems are not suitable for use in dynamic vulcanization of oil-resistant TPVs.

PP/EPDM TPVs can also be cured with peroxide, although peroxide does cleave PP chains to some extent. PP chain cleavage can be limited by, for example, the use of co-agents along with the peroxide, or addition of a sacrificial additive that preferentially reacts with peroxide over PP. However, very little loss in MW due to peroxide degradation can be tolerated when using polar plastics such as PBT because they have molecular weights much lower than PP. Thus, peroxide cure is unacceptable for the preparation of oil-resistant TPVs.

In addition, residual peroxide in a peroxide-cured TPV may necessitate long post cure time after part fabrication to achieve suitable part stability.

Curing of acrylate rubber during the preparation of oil-resistant TPVs commonly results in the elimination of small polar condensate molecules which can lead to porous pellets that absorb water during product pelletization. Eliminating water from the pellets sufficiently is difficult, and molding of wet pellets often leads to poor fabricated part surface appearance, in addition to reducing plastic molecular weight. Further, polar condensate molecules are trapped efficiently in the polar TPV melt. Although considerable amounts volatiles are evolved by melt surface thermo-oxidative degradation during the reactive extrusion of TPVs, the surface generated volatiles are readily removed when exposed to vacuum in the extruder. Staged TPV preparation processes, although useful, are undesirable for the preparation of oil-resistant TPVs.

A cured polar rubber swells to a much less extent in a polar plasticizer than EPDM rubber in paraffinic oil. In a TPV, high MW EPDM can readily absorb 150 parts per 100 parts of rubber (phr) of oil without forming a separate oil phase. Over 50 phr of a polar plasticizer may result in a separate plasticizer phase in, for example, an NBR based TPV, leading to plasticizer exudation from the product on storage. Thus, addition of plasticizer is of very limited utility in melt viscosity reduction during the preparation of oil-resistant TPVs.

The creep properties and melting point of a TPV plastic phase are among the properties that influences product performance. Among the polar plastics, semi-crystalline polyesters have better creep properties than nylons due to chain slip allowed by hydrogen bonding in the latter materials. On the other hand, fluoroplastics, which are typically produced by emulsion or suspension polymerization, are advantageously available at much higher molecular weights than condensation polymers such as PBT. However, the creep properties of these materials are poorer than that of PBT.

Plastic rubber combinations such as fluoroplastic/fluoroelastomer, PBT or Nylon/fluoroelastomer, PBT/Silicone rubber have a major drawback in TPV applications: these systems are not capable of forming the a "mechanical lock" similar to that generated in PP/EPDM systems. Further, the compatibilizers are not effective to improve the adhesion between the plastic and rubber phase. And because of their low surface energy, fluoroelastomers and silicone rubber can be dispersed readily in plastic materials, but this property precludes strong adhesion between the plastic and rubber phases.

U.S. Pat. No. 7,291,667 discloses the preparation of Nylon and XNBR TPVs in a multi-stage batch process using peroxide as a curing agent.

U.S. Pat. No. 7,659,339 also discloses the preparation of TPVs manufactured using Nylon and XNBR. The '339 patent states that the TPVs disclosed therein containing low Mooney rubber, have improved processability compared to TPVs in the '667 patent.

U.S. Pat. No. 6,207,752 claims oxazoline cured Polyester/XNBR TPV compositions made in a small-scale laboratory mixer. The disclosed TPV compositions are made with a processing aid such as a maleic anhydride grafted polyolefin.

Processability in continuous manufacturing systems, such as those that employ a twin-screw extruder, is an important requirement for the commercial production of TPVs. Although TPVs can be prepared using batch processes, batch processes for the manufacturing of TPVs are typically inefficient and the resulting TPVs are not amenable to manufacture in a more efficient continuous TPV manufacturing process Thus, there is a need for oil-resistant TPVs that avoid the compositional, manufacturing, and use limitations discussed above. There is also a need for such TPVs that can be made and processed on a commercial scale using a large scale-continuous system, e.g., a single-screw or a twin-screw extruder.

SUMMARY

This disclosure provides a convenient solution to the problems identified above.

In one aspect, this disclosure provides thermoplastic vulcanizate compositions, typically oil resistant thermoplastic vulcanizates that are readily processable. These TPVs are made by dynamic vulcanization of carboxylated nitrile rubber (XNBR) with high melting point, semi-crystalline thermoplastic materials. The thermoplastic vulcanizates disclosed herein are typically resistant to hydrocarbon oils at a broad range of temperatures.

In another aspect, the semi-crystalline thermoplastic materials are selected from polyesters, semi-crystalline copolyester elastomers (COPEs), and nylons.

In other aspects, the TPVs are made using addition-type curing agents that do not generate volatiles during cure, and do not degrade the plastic phase.

In other aspects, the TPVs are made using processing aids that allow ease of fabrication of the TPVs by plastic molding techniques such as injection molding, extrusion, and blow molding, and with excellent fabricated product surface appearance.

In a broad aspect, this disclosure provides thermoplastic vulcanizates comprising a plastic phase and a rubber phase, wherein
 a) the plastic phase comprises from about 35 parts to about 95 parts by weight, based on 100 parts by weight of the plastic and rubber phases, of a plastic having a melting point of about 160° C. to about 260° C., wherein the plastic is
  i) a semi-crystalline engineering polyester,
  ii) a semi-crystalline copolyester elastomer,
  iii) a semi-crystalline aliphatic polyamide, or a mixture thereof; and
 b) the rubber phase comprises from about 65 parts to about 5 parts, by weight based on 100 parts by weight of the plastic and rubber phases, of a carboxylated nitrile rubber; and
 c) crosslinks between reactive groups in the carboxylated nitrile rubber.

In another aspect, the disclosure provides thermoplastic vulcanizates prepared by dynamically crosslinking a melt blend with an addition type curing agent, wherein the melt blend comprises a plastic phase and a rubber phase, and wherein
 a) the plastic phase comprises from about 35 parts to about 95 parts by weight, based on 100 parts by weight of the plastic and rubber phases, of a plastic having a melting point of about 160° C. to about 260° C., wherein the plastic is
  i) a semi-crystalline engineering polyester;
  ii) a semi-crystalline copolyester elastomer, or
  iii) a semi-crystalline aliphatic polyamide, or a mixture thereof; and
 b) the rubber phase comprises from about 65 parts to about 5 parts, by weight based on 100 parts by weight of the plastic and rubber phases, of a carboxylated nitrile rubber.

In another aspect, this disclosure provides a process for producing thermoplastic vulcanizates comprising mixing a composition comprising a plastic phase and a rubber phase with an addition type curing agent, wherein the mixing is carried out under conditions of shear and at a temperature above the melting point of the plastic phase, and wherein
 a) the plastic phase comprises from about 35 parts to about 95 parts by weight, based on 100 parts by weight of the plastic and rubber phases, of a plastic having a melting point of about 160° C. to about 260° C., wherein the plastic is
  i) a semi-crystalline engineering polyester,
  ii) a semi-crystalline copolyester elastomer, or
  iii) a semi-crystalline aliphatic polyamide, or mixtures thereof; and
 b) the rubber phase comprises from about 65 parts to about 5 parts, by weight based on 100 parts by weight of the plastic and rubber phases, of a carboxylated nitrile rubber.

In another aspect, this disclosure provides thermoplastic elastomers comprising a plastic phase and a rubber phase, wherein
 a) the plastic phase comprises from about 35 parts to about 95 parts by weight, based on 100 parts by weight of the plastic and rubber phases, of a plastic having a melting point of about 160° C. to about 260° C., wherein the plastic is
  i) a semi-crystalline engineering polyester,
  ii) a semi-crystalline copolyester elastomer,
  iii) a semi-crystalline aliphatic polyamide, or a mixture thereof; and
 b) the rubber phase comprises from about 65 parts to about 5 parts, by weight based on 100 parts by weight of the plastic and rubber phases, of a carboxylated nitrile rubber; and
 c) an optional plasticizer, wherein the amount of plasticizer, when present, is from about 0 parts to about 35 parts, based on 100 parts by weight of the plastic and rubber phases.

The thermoplastic elastomers are typically pre-vulcanized compositions and can be used as intermediates in the preparation of the disclosed fully vulcanized TPV products. These elastomers are pre-crosslinked compositions and are substantially free of cross-linked rubber material. The final thermoplastic vulcanizates of this disclosure can be made directly from the thermoplastic elastomers by mixing the elastomer composition with an addition-type curing agent and subjecting the resulting mixture to dynamic vulcanization, i.e., conditions of shear at a temperature above the melting point of the polyester component.

In a related aspect, this disclosure provides thermoplastic elastomers comprising a plastic phase and a rubber phase as defined above as well as an addition-type curing agent. These compositions can also be used in the manufacture of the fully vulcanized products by merely subjecting the compositions to dynamic vulcanization. The compositions of this disclosure are made using addition-type curing agents that advantageously cure the rubber without evolution of volatiles or degradation of the plastic phase, and that facilitate rubber and plastic compatibilization.

The compositions of this disclosure can be readily produced using conventional plastic compounding equipment. For example, the compositions of this disclosure can be prepared using a single-screw extruder or a co-rotating twin screw (TSE) extruder. Further, the processes of this disclosure do not require and preferably avoid a staged TPV preparation process.

Using conventional fabricating equipment (e.g., by injection, extrusion and blow molding equipment) the compositions described herein can be used to yield a variety of molded products. These products have excellent surface appearance.

The TPVs disclosed have excellent resistance to oils including hydrocarbon oils and are therefore suitable for a wide variety of uses. These TPVs do not exhibit the compositional, manufacturing, and use limitations discussed above.

BRIEF DESCRIPTION OF THE FIGURES

FIG. 1 is a diagram of the barrel setup in the twin-screw extruder described and used in Example 1. The numbers refer to the barrels described in the examples.

DETAILED DESCRIPTION

As used herein, the term thermoplastic vulcanizate (TPV) refers a thermoplastic elastomer produced via dynamic vulcanization of a blend of a rubber phase and a thermoplastic polymer in the presence of a vulcanizing system.

The acronym "XNBR" used herein refers to carboxylated nitrile butadiene rubber.

The terms semi-crystalline copolyester elastomer, segmented polyester block copolymer and COPE are used interchangeably.

As used herein, the term "dynamic vulcanization" means a vulcanization or curing process for a rubber contained in a thermoplastic vulcanizate composition, wherein the rubber is vulcanized under conditions of shear at a temperature above the melting point of the polyester component. The rubber is thus simultaneously cross-linked and typically dispersed as fine particles within the polyester matrix. Although particles are the typical morphology, other morphologies may also exist.

Thermoplastic vulcanizates typically have finely dispersed, micron-sized, crosslinked rubber particles distributed in a continuous thermoplastic matrix.

Unless otherwise specified, "parts" of a particular TPV component, e.g., plastic, rubber or curing agent, refers to parts by weight.

The disclosures of all patents and literature references identified herein are hereby incorporated by reference in their entirety.

As noted above, this disclosure provides thermoplastic vulcanizates comprising a plastic phase and a rubber phase.

In this aspect, Embodiment 1, the plastic phase comprises from about 35 parts to about 95 parts by weight, based on 100 parts by weight of the plastic and rubber phases, of a plastic having a melting point of about 160° C. to about 260° C., wherein the plastic is
  i) a semi-crystalline engineering polyester,
  ii) a semi-crystalline copolyester elastomer,
  iii) a semi-crystalline aliphatic polyamide, or a mixture thereof.

The rubber phase of Embodiment 1 comprises from about 65 parts to about 5 parts, by weight based on 100 parts by weight of the plastic and rubber phases, of a carboxylated nitrile rubber; and crosslinks between reactive groups in the carboxylated nitrile rubber.

In the thermoplastic vulcanizates of Embodiment 1, the crosslinks can be formed by a reaction between an addition type curing agent and the reactive groups in the carboxylated nitrile rubber.

In another embodiment, Embodiment 2, this disclosure provides thermoplastic vulcanizates prepared by dynamically crosslinking a melt blend with an addition type curing agent. The melt blend comprises a plastic phase and a rubber phase.

The plastic phase in Embodiment 2 comprises from about 35 parts to about 95 parts by weight, based on 100 parts by weight of the plastic and rubber phases, of a plastic having a melting point of about 160° C. to about 260° C., wherein the plastic is
  i) a semi-crystalline engineering polyester;
  ii) a semi-crystalline copolyester elastomer, or
  iii) a semi-crystalline aliphatic polyamide, or a mixture thereof.

The rubber phase in Embodiment 2 comprises from about 65 parts to about 5 parts, by weight based on 100 parts by weight of the plastic and rubber phases, of a carboxylated nitrile rubber.

The thermoplastic polymers or plastics, i.e., nylons, polyesters, and COPEs, used herein preferably have melting points between about 160° C. or 170° C. and about 260° C. The amount of plastic ranges from about 35 parts to 95 parts, and the amount of XNBR ranges from about 65 parts to about 5 parts, based on 100 parts of plastic and rubber. In particular aspects, the amount of curing agent useful herein is from about 0.5 part to about 15 parts based on 100 parts of rubber and plastic.

In certain aspects of Embodiments 1 and 2, the plastic phase comprises about 40 parts to about 70 parts by weight, based on 100 parts by weight of the plastic and rubber phases, of the plastic, and the plastic has a melting point of about 160° C. to about 260° C. and is
  i) a semi-crystalline engineering polyester,
  ii) a semi-crystalline copolyester elastomer or mixtures thereof; and the rubber phase comprises from about 60 parts to about 30 parts, by weight based on 100 parts by weight of the plastic and rubber phases, of the carboxylated nitrile rubber.

In other aspects of embodiments 1 and 2, the plastic phase comprises about 70 parts to about 95 parts by weight, based on 100 parts by weight of the plastic and rubber phases, of the plastic, and the plastic has a melting point of about 160° C. to about 260° C. and is
  i) a semi-crystalline engineering polyester,
  ii) a semi-crystalline copolyester elastomer or mixtures thereof; and the rubber phase comprises from about 30 parts to about 5 parts, by weight based on 100 parts by weight of the plastic and rubber phases, of the carboxylated nitrile rubber.

In other aspects of embodiments 1 and 2, the plastic phase comprises about 35 parts to about 95 parts by weight, based on 100 parts by weight of the plastic and rubber phases, of the plastic, and the plastic has a melting point of about 160° C. to about 260° C. and is a semi-crystalline aliphatic polyamide, and the rubber phase comprises from about 65 parts to about 5 parts, by weight based on 100 parts by weight of the plastic and rubber phases, of the carboxylated nitrile rubber.

Thermoplastic Polymer

The thermoplastic polymers useful herein are desirably polar, crystalline or semi-crystalline, and have high melting points. The melting point of the thermoplastic polymers is between about 160° C. and about 260° C. Thus, the thermoplastic polymers have melting points of about 160° C., about 170° C., about 180° C., about 190° C., about 200° C., about 210° C., about 220° C., about 230° C., about 240° C., about 250° C., or about 260° C. Suitable thermoplastic polymers include polyesters and segmented block copolymers of polyester.

The molecular weight of a suitable thermoplastic polymer is such that it is a suitable engineering plastic. Accordingly, the weight averages molecular weight of the various polyesters generally range from about 40,000 to above 110,000 with from about 50,000 to about 100,000 being preferred.

Suitable amounts of plastic (thermoplastic polymer) based on 100 parts of plastic and rubber in the TPV formulations include from about 30-95 parts, from about 35-90 parts, from about 40-85 parts, from about 40-80 parts, from about 40-70 parts, about 30 parts, about 35 parts, about 40 parts, about 45 parts, about 50 parts, about 55 parts, about 60 parts, about 65 parts, about 70 parts, about 75 parts, about 80 parts, about 85 parts and about 90 parts.

Polyesters

Polyesters are condensation polymers. The various polyesters can be either aromatic or aliphatic or combinations thereof and are generally directly or indirectly derived from the reactions of diols such as glycols having a total of from 2 to 6 carbon atoms and desirably from about 2 to about 4 carbon atoms with aliphatic acids having a total of from about 2 to about 20 carbon atoms and desirably from about 3 to about 15 carbon atoms or aromatic acids having a total of from about 8 to about 15 carbon atoms. Generally, aromatic polyesters are preferred such as polyethyleneterephthalate (PET), polytrimethyleneterephthalate (PTT), polybutyleneterephthalate (PBT), polyethyleneisophthalate, and polybutylenenapthalate.

Particularly useful polyesters for use in the plastic phase herein are poly(butylene terephthalate), poly(trimethylene terephthalate), and poly(ethylene terephthalate).

Other particularly useful polyesters are semi-crystalline and produced by the condensation of aromatic diacids with aliphatic diols. Specific non-limiting examples are poly(butylene terephthalate), poly (trimethylene terephthalate) and poly (ethyleneterephthalate). Aromatic/aliphatic polyesters and copolymers thereof with melting points of about 160° C. or 170° C. to about 260° C. are particularly useful. Other suitable polyesters include aliphatic polyesters having melting points of about 160° C. or 170° C. to about 260° C., such as, for example, poly (1,4-cyclohexylenedimethylene-1,4-cyclohexanedicarboxylate). Polyesters having high molecular weights are particularly useful herein. For example, PBT having $M_n$ (number average molecular weight) of about 50,000 and $M_w$ (weight average molecular weight) of about 100,000 is particularly suitable for use herein.

Segmented Polyester Block Copolymer

Segmented polyester block copolymers or COPES are linear condensation multi-block copolymers consisting of alternating hard and soft blocks. Suitable segmented polyester block copolymers include segmented polyester-polyether and the like. These block copolymers contain at least one block of a polyester and at least one rubbery block such as a polyether derived from glycols having from 2 to 6 carbon atoms, e.g., polyethylene glycol, or from alkylene oxides having from 2 to 6 carbon atoms. For example, the hard crystalline blocks can be derived from high melting aromatic/aliphatic oligomers of (butylene terephthalate), and the soft blocks can be composed of low $T_g$ oligomers of aliphatic glycols such as those derived from ethylene glycol, 1,3-propanediol, 1,4-butanediol or the oligomerization of tetrahydrofuran. A preferred block polyester-polyether polymer is polybutyleneterephthalate-b-polytetramethylene glycol which is available as Hytrel from DuPont. Also useful herein are block copolymers wherein the soft blocks are derived from the oligomerization of trimethylene diol, with PBT hard blocks as described in U.S. Pat. No. 7,244,790. The hard phase melting point of the COPEs useful herein ranges from about 160° C. to 260° C. High molecular weight COPEs with $M_n$ of about 50,000 and $M_w$ of about 100,000 are particularly useful.

COPEs suitable for use herein are described in "Thermoplastic Elastomers", G. Holden et al eds., Hanser/Gardner Publications, Inc., Cincinnati, Ohio, 1996, Ch. 8.

Aliphatic Polyamide

Suitable polyamides for use as the thermoplastic material in the plastic phase include semi-crystalline aliphatic polyamides (condensation polymers of aliphatic diamines with aliphatic diacids, or polymers obtained by the polymerization of an AB monomer such as caprolactam) or copolyamides thereof, having melting points between about 160° C. or 170° C. and about 260° C. Suitable polyamides have medium to high molecular weights, i.e., molecular weights sufficient to produce with relative viscosities between about 2 to about 4, as measured in 96 weight percent sulfuric acid at a 1% concentration (mass of Nylon in volume of sulfuric acid). Particularly useful polyamides include polycondensation products of hexamethylenediamine and adipic acid (e.g., Nylon 6/6), hexamethylenediamine and 1,12-dodecanedioic acid (e.g., Nylon 6/12), and pentamethylene diamine and sebacic acid (e.g., Nylon 510). Other examples of suitable polyamide thermoplastic materials are poly(11-aminoundecanoic acid), i.e., Nylon 11, polycaprolactam, i.e., Nylon 6, polylaurolactam, i.e., Nylon 12, poly(hexamethylene adipamide-co-caprolactam), i.e., Nylon 6/66, and the product of acid-catalyzed amide formation between adiponitrile, formaldehyde, and water (Nylon 1,6). Examples of suitable polyamides are the Trogamid® polyamides. Mixtures of these polyamides may suitably be used in the TPVs disclosed herein.

Carboxylated Nitrile Rubber

The rubber phase of the thermoplastic vulcanizates disclosed herein comprise carboxylated nitrile rubber, which is a copolymer of that can be produced from conjugated dienes having from 4 to 8 carbon atoms, a nitrile monomer, and an acid monomer.

Suitable dienes are 1,3-butadiene, isoprene, 2,3-dimethyl-1,3-butadiene, and piperylene, with 1,3-butadiene being particularly useful. Suitable nitrile monomers include acrylonitrile, methacrylonitrile and α-chloroacrylonitrile with acrylonitrile being particularly useful. Suitable acid monomers are acrylic acid and methacrylic acid. Acids such as crotonic, maleic (or in the anhydride form), fumaric, or itaconic acid can also be used. The conjugated diene can vary from 50 to 80% of the polymer, the nitrile from 15 to 40%, and the acid from 1 to 10%, the percentages being by weight.

Suitable carboxylated nitrile rubbers for use herein have a small particle size, i.e., less than about 50 microns. Particularly useful carboxylated nitrile rubbers have a particle size of from about 1 to about 10 microns. Such sizes can produce desirable physical properties and processing characteristics.

A particularly suitable XNBR for use herein is Nipol 1072X28, with about 27 weight % bound acrylonitrile, about 0.08 equivalents carboxylic acid per 100 parts rubber, and 50-60 weight percent gel in methyl ethyl ketone (ML(1+4, 100° C.)=35-55). Nipol 1072X28 is partially cross-linked during emulsion polymerization, but still allows good rubber dispersibility in plastics during rubber and plastic melt mixing, which is necessary for dynamic vulcanization. Other suitable XNBR materials are Krynac X740 (ML(1+4, 100° C.)=34-42) and Krynac X750 (ML(1+4, 100° C.)=42-52) from Arlanxeo, and NPX-2035G (ML(1+4, 100° C.)=40-55) from Nitriflex.

Suitable amounts of XNBR based on 100 parts of plastic and rubber in the TPV formulations include from about 70-5 parts, from about 65-5 parts, from about 60-10 parts, from about 60-15 parts, from about 60-20 parts, from about 60-25 parts, from about 60-30 parts, about 5 parts, about 10 parts, about 15 parts, about 20 parts, about 25 parts, about 30 parts, about 35 parts, about 40 parts, about 45 parts, about 50 parts, about 55 parts, about 60 parts, about 65, and about 70 parts.

The thermoplastic vulcanizates of Embodiments 1 and 2 can include crosslinks between at least about 90% by weight of the carboxylated nitrile rubber.

Particular thermoplastic vulcanizates of Embodiments 1 and 2 include those wherein the amount of the carboxylated nitrile rubber lacking crosslinks is less than about 10 weight percent based on the weight of the carboxylated nitrile rubber.

Particular thermoplastic vulcanizates of Embodiments 1 and 2 include those wherein the carboxylated nitrile rubber has 0.5 mol percent to 10 mol percent of cure site repeat units.

Addition Type Curing Agent

The carboxylated nitrile rubber is cured utilizing various curative compounds including oxazoline, oxazine, and imidazolines such as bisimidazoline. More specifically, the nitrile rubber phase is cured via the carboxylic acid moiety in the carboxylated nitrile rubber, using addition type curing agents such as 1,3-phenylene-bis 2,2'-(oxazoline-2). Alternatively, the addition type curing agent can be a multifunctional epoxide.

Suitable addition type curing agents for use herein include those that do not break down the plastic phase and do not form volatile compounds such as water. Other curing agents can be utilized such as free radical generating compounds, but are less desirable and are therefore used in small amounts such as, for example, less than 1.0 parts by weight and desirably less than 0.5 parts by weight based upon 100 parts by weight of the carboxylated nitrile rubber. A highly preferred addition curative or cross-linking agent is the various oxazolines or oxazines such as those having Formula A or Formula B

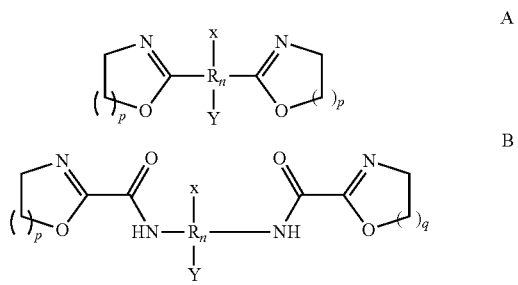

wherein R or R' is an aliphatic or aromatic hydrocarbon group such as alkylene or arylene having 1 to 24 carbon atoms optionally substituted with one or more alkyl groups having 1 to 6 carbon atoms or substituted with an aryl group having 6 to 9 carbon atoms; n is 0 or 1, when n equals 1 then X and Y are hydrogen atoms or independently an 2-oxazoline group or a 1,3-oxazine group, or a 2-oxazoline group or a 1,3-oxazine group and a hydrogen atom, with the remaining carbon atoms having hydrogen atoms thereon, p and q, independently, is 1 or 2, and when n equals 0 then R, X, and Y are nonexistent. Further, each oxazoline group of the above formula may optionally be substituted with an alkyl of 1 to 6 carbon atoms. Further descriptions of said polyvalent oxazolines are set forth in U.S. Pat. No. 4,806,588, herein incorporated by reference. Preferred oxazolines include 2,2'-bis(oxazoline-2), 2,2'hexamethylenedicarbamoylbis(oxazoline-2), and 1,3-phenylene-2,2'bis(oxazoline-2).

Various bismaleimides as well as phenolic resins can also be used as curatives. Examples of bismaleimides include a bismaleimide based on methylene dianiline (e.g., Matrimid 5292A from Ciba-Geigy), a bismaleimide based on toluene diamine (e.g., HVA-2 from DuPont), and the like. The phenolic curing agents are well known to the art and literature and include polymers obtained by the polymerization of phenol with formaldehyde. The polymerization rate is pH dependent, with the highest reaction rates occurring at both high and low pH. A more detailed description of the preparation of phenolic resins is set forth in "Principles of Polymerization" 3.sup.rd Edition, George Odian, pages 125-131, John Wiley Sons, Inc., N.Y., N.Y., 1991, which is hereby fully incorporated by reference. Examples of specific phenolic resins include those of formula C

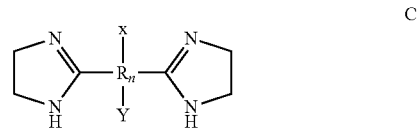

where R and n are defined as above for the multifunctional (polyvalent) oxazolines and X and Y, are a hydrogen atom, or, independently, an imidazoline group, or an imadazoline group and a hydrogen atom. A preferred multifunctional imidazoline is bismidazoline.

Particularly useful addition type curing agents for use herein are 2,2'-(1,3-phenylene)bis(2-oxazoline) (1,3-PBO), 2,2'-(1,4-phenylene)bis(2-oxazoline) (1,4-PBO), and 2,2'-(2,6-pyridylene)bis(2-oxazoline) (2,6-PyBO), or mixtures thereof.

Still another group of addition type curatives are the various multifunctional epoxides such as the various Shell Epon® resins, epoxidized vegetable oils, tris(2,3-epoxypropyl)isocyanate, and 4,4'-methylene bis(N,N-diglycidylaniline), and multifunctional aziridines. A particularly useful epoxide for use herein as the addition type curing agent is a styrene/glycidyl methacrylate copolymer.

Oxazolines such as 1,3-PBO and 2,6-PyBO react with the acid functionality that is pendent to the rubber backbone to form an ester-amide cross-links. Nylons and polyesters can also get linked to the rubber by selective reaction of the curing agent with only the end acid functionality of these plastic macromolecules, that is, neither the amine end groups of nylons nor the hydroxyl end groups of polyesters exhibit notable reactivity with 1,3-PBO under typical reaction conditions.

2,6-PyBO has a faster rubber cure rate than 1,3-PBO and, therefore, can be used advantageously when rapid cure is desired.

In certain embodiments, the curing agent, typically an excess of the curing agent relative to plastic, can be melt blended with the plastic to produce a blend of curative and plastic. The excess curing agent end-functionalizes the carboxylic acid moieties of the plastic macromolecules which compatibilizes the plastic with the rubber and limits chain extension of the plastic macromolecules.

The amount of the curative or curing agent is generally from about 0.5 to 15, desirably from 3 to 12 parts by weight for every 100 parts by weight of the carboxylated nitrile rubber and the plastic. Suitable amounts of curing agent include about 0.5, 1, 2, 3, 4, 5, 6, 7, 8, 9, 10, 11, 12, 13, 14 and 15 parts by weight for every 100 parts by weight of the carboxylated nitrile rubber and the plastic. Particularly useful amounts of curing agent range from about 0.5 part to about 15 parts based on 100 parts of rubber and plastic.

In certain aspects, oxazoline curing agents are used to avoid degradation of the TPV plastic phase, and allow selective addition crosslinking of the rubber. In certain aspects, oxazoline curing agents avoid product processability problems that can be caused by volatile by-products from the curing reaction being trapped in the TPV melt.

The addition curatives effect cross-linking by reacting with the carboxylic acid groups present in the nitrile rubber or double bonds of the diene hydrocarbon portion derived from the diene monomer. The amount of curatives used results in at least a partially cured nitrile rubber and preferably a fully or completely vulcanized nitrile rubber.

The terms "fully vulcanized" and "completely vulcanized" as used in the specification and claims means that the rubber component to be vulcanized has been cured to a state in which the elastomeric properties of the cross-linked rubber are similar to those of the rubber in its conventional vulcanized state, apart from the thermoplastic vulcanizate composition, or as indicated by no more change in tensile strength. The degree of cure can be described in terms of gel content or, conversely, extractable components. Alternatively, the degree of cure may be expressed in terms of cross-link density. All of these descriptions are well known in the art, for example, in U.S. Pat. Nos. 5,100,947 and 5,157,081, both of which are fully incorporated herein by this reference. By the term "partially vulcanized" (i.e., degree of cure), it is meant that about 30 percent or less and desirably about 10 percent or less by weight of a carboxylated nitrile rubber is soluble in methyl ethyl ketone at 80° C. By the term "fully vulcanized" (i.e., degree of cure), it is meant that about 5 percent or less of the cured carboxylated nitrile rubber is soluble in a methyl ethyl ketone at 80° C.

Plasticizer

Thermoplastic vulcanizates of Embodiments 1 and 2 can further comprise a plasticizer that is melt miscible with both the rubber phase and the plastic phase. Suitable plasticizers for use herein are selected from polyether esters, monomeric ether esters, aliphatic polymeric esters, aromatic polymeric esters, polyesters, ester terminated poly butylene adipates, sulfonamides, and mixtures thereof. Plasticizers that are melt miscible with the TPV plastic phase, or rubber phase, or both, are useful in certain aspects of this disclosure. In certain embodiments, the plasticizer is not melt-miscible with either the rubber phase or the plastic phase.

The amount of plasticizer ranges from about 4 parts to about 35 parts, based on 100 parts of rubber and plastic phases in the formulation. Suitable amounts of plasticizer, based on 100 parts of rubber, in the TPV formulations are about 4 parts, about 10 parts, about 15 parts, about 20 parts, about 25 parts, about 30 parts, and about 35 parts.

In certain aspects of this disclosure, TPV formulations comprise about 40 parts to about 70 parts of plastic, and from about 60 parts to about 30 parts of XNBR, in addition to an effective amount of a plasticizer. Effective amounts of the plasticizer are from about 4 parts or 8 parts to about 35 parts per 100 parts of rubber and plastic phases.

Examples of such formulations include those containing XNBR and plastic at a rubber to plastic weight ratio of about 1.1 to about 1.35 (about 52-57 parts rubber to about 48-43 parts plastic) and about 4 parts to about 35 parts, based on 100 parts of the rubber and plastic phases, of a plasticizer.

In certain aspects, a plasticizer is incorporated into the TPV formulation to achieve processable (low enough melt viscosity, excellent fabricated product surface appearance) TPV compositions with plastic content of about 70 weight percent or lower, based on only the rubber and plastic in the composition. In certain situations, at this level of plastic, lack of plasticizer results in some molding machines being incapable of fabricating the TPV melt due to high viscosity, or the fabricated product exhibits severe melt fracture. The plasticizer is preferably miscible with the TPV plastic phase only, although plasticizers that are miscible with both the TPV rubber and plastic phase are also acceptable.

Plasticizers for Polyesters

Suitable plasticizers for polyesters such as PBT include 2,2-dimethylpropane diol 1,3-dibenzoate (Uniplex 512), polyethylene glycol dilaurate (Uniplex 810), and other polyethylene glycol esters such as Tegmer 804S, 809, 810, 812, and 39-N. Also useful are poly alkylene adipates of various MWs such as Paraplex A 8600, Paraplex A8210, and Paraplex A 8000 that is available from Hallstar. Particularly useful are ester terminated poly 1,3-butylene adipates (e.g., PN-250 from Amfine) that have a low freezing points (e.g., about −20° C.) and excellent thermal and thermo-oxidative stability.

Plasticizers for XNBR

Low volatility ether ester plasticizers such as TP-90B, TP-95, TP-759, Tegmer 39-N, 804S, 809, 810, and 812 (all of which are commercially available from Hallstar International) that are also plasticizers for PBT are also suitable for XNBR. Plasthall series ester plasticizers such as, Plasthall TO™, are also useful. A description of the structures of some of these plasticizers can be found in Rubber World p. 32, April 2015.

Plasticizers for COPEs

COPEs are typically miscible only to a limited extent with plasticizers after a polymer/plasticizer melt blend crystallizes at room temperature. Hence, for TPVs made with COPEs as the plastic phase, it is important that any plasticizer rejected on crystallization of the plastic phase be absorbed by the particulate rubber contained therein. Examples of suitable plasticizers for COPEs are diester terminated polyalkylene diols such as diester terminated poly ethylene glycol.

Plasticizers for Nylons

Plasticizers useful with Nylon (polyamide) materials may be solid or liquid at ambient temperature. Examples of these plasticizers include benzenesulfonamide (solid at room temperature) and various N-alkylbenzenesulfonamides (solid or liquid at room temperature). N-butylbenzenesulfonamide (Uniplex 214) and N-ethyl-o/p-toluenesulfonamide (Uniplex 108) are liquids, while certain N-alkyl-p-toluenesulfonamides are solids. Other suitable solid plasticizers for nylon include methyl or propyl 4-hydroxybenzoate.

Plasticizers that are melt-miscible with the TPV plastic phase only tend to increase the plastic melt volume which helps in preventing rubber particle agglomeration. Prevention of rubber particle agglomeration is useful when intensive melt mixing of the TPV stops as the product is pumped into a die for strand formation, and subsequent strand cutting into pellets. Increased plastic phase volume also facilitates phase inversion during dynamic vulcanization, which is useful in achieving a plastic continuous TPV phase. In certain aspects herein, a plasticizer is useful for producing molten strands with smooth surfaces and no or limited melt fractures.

Other suitable nylon plasticizers are described in Polymer International, 51, 40-49 (2001); Polym. Bull., 68, 1977-1988 (2012); Polym. Adv. Technol., 23, 938-945 (2012); and Polym. Adv. Technol., 28, 53-58 (2017).

In certain embodiments, the semi-crystalline engineering polyester is a poly (butylene terephthalate), poly (trimethylene terephthalate), poly (ethylene terephthalate), or mixture thereof, and the plasticizer is an ester terminated poly (1,3-butylene adipate) and the thermoplastic vulcanizate comprises about 4 to 20 parts, based on 100 parts of plastic and rubber, of the plasticizer.

In certain embodiments, the semi-crystalline copolyester elastomer comprises crystalline segments derived from poly (butylene terephthalate), and the elastomeric segments are derived from poly (dimethylene oxide), poly (trimethylene oxide), poly (tetramethylene oxide, or mixtures thereof, and the semi-crystalline copolyester elastomer has a hardness from about Shore D 70 to about Shore D 85, and the plasticizer is a diester terminated poly ethylene glycol, and the thermoplastic vulcanizate comprises about 4 to 35 parts, based on 100 parts of plastic and rubber, of the plasticizer.

In certain embodiments, the aliphatic polyamide is a polycaprolactam, polylaurolactam, poly(11-aminoundecanoic acid), a polyamide derived from hexamethylenediamine and adipic acid, poly(hexamethylene adipamide-co-caprolactam, or a mixture thereof, and the plasticizer is N-(n-butyl)benzenesulfonamide and the thermoplastic vulcanizate comprises about 4 to 35 parts, based on 100 parts of plastic and rubber, of the plasticizer, or the plasticizer is methyl 4-hydroxybenzoate and the thermoplastic vulcanizate comprises about 5 to 20 parts of the plasticizer based on 100 parts of plastic and rubber.

Other Plasticizers for Nylons, Polyester, and COPEs

Also acceptable are plasticizers that are melt miscible with the TPV plastic phase, but are immiscible in the amorphous plastic phase of the TPV at room temperature, and hence may be present as sub-micron pools of liquid in the TPV plastic phase at room temperature, but show no tendency for exudation from TPV pellets or molded parts produced from the TPV.

Processing Aid

The thermoplastic vulcanizates of Embodiments 1 and 2 can include a processing aid.

Suitable processing aids include maleated polyolefins and maleated vinylidene fluoride polymers or copolymers.

Other suitable processing aids are polypropylene, polyethylene, or vinylidene fluoride/hexafluoropropylene copolymer with 0.1 weight % to about 3 weight % of maleate group content.

Cure Accelerators

In certain aspects, the thermoplastic vulcanizates disclosed herein can further comprise a cure accelerator selected from aryl phosphites, alkyl phosphites, aryl/alkyl phosphite, and mixtures thereof. Particular cure accelerators suitable for use herein are selected from tris(2,4-di-t-butylphenyl) phosphite, bis(2,4-di-t-butylphenyl)pentaerythritol diphosphite, and mixtures thereof.

Optional Additives

In addition to the thermoplastic polymer, carboxylated nitrile rubber, the processing aid, and the curing agent, the thermoplastic vulcanizates disclosed herein can include various conventional additives such as reinforcing and non-reinforcing fillers, extenders, antioxidants, antiozonants, stabilizers, rubber processing oil, extender oils, lubricants, plasticizers, anti-blocking agents, anti-static agents, waxes, foaming agents, pigments, flame retardants and other processing aids known in the rubber compounding art. Such additives can comprise up to about 60 weight percent of the total composition, and can be in the plastic phase, the rubber phase or both. Fillers and extenders which can be utilized include conventional inorganics such as calcium carbonate, clays, silica, talc, titanium dioxide, carbon black, and the like. The rubber processing oils generally are paraffinic, naphthenic or aromatic oils derived from petroleum fractions. The type will be that ordinarily used in conjunction with the specific rubber or rubbers present in the compositions, and the quantity based on the total rubber content may range from zero to about 100 phr and preferably from about 10 to about 40 phr.

In certain embodiments of this disclosure, the crosslinks are formed by a reaction between an addition type curing agent and reactive groups in the carboxylated nitrile rubber.

In certain embodiments of this disclosure, the plastic phase comprises 35 parts to 70 parts, 40 parts to 70 parts, 35 parts to 60 parts, 40 parts to 60 parts, 55 parts to 85 parts or 70 parts to 95 parts by weight, based on 100 parts by weight of the plastic and rubber phases, of a plastic, and the plastic has a melting point of 160° C. to 260° C. and is
  i) a semi-crystalline engineering polyester,
  ii) a semi-crystalline copolyester elastomer, or a mixture thereof, and the rubber phase comprises from 65 parts to 30 parts, 60 parts to 30 parts, 65 parts to 40 parts, 60 parts to 40 parts, 45 parts to 15 parts or 30 parts to 5 parts, by weight based on 100 parts by weight of the plastic and rubber phases, of the carboxylated nitrile rubber.

In certain embodiments of this disclosure, the plastic phase comprises 35 parts to 95 parts by weight, based on 100 parts by weight of the plastic and rubber phases, of a plastic, and the plastic has a melting point of 160° C. to 260° C. and is a semi-crystalline aliphatic polyamide, and the rubber phase comprises from 65 parts to 5 parts, by weight based on 100 parts by weight of the plastic and rubber phases, of the carboxylated nitrile rubber.

In certain embodiments of this disclosure, the thermoplastic vulcanizate further comprises a plasticizer.

In certain embodiments of this disclosure, the plasticizer is selected from polyether esters, monomeric ether esters, aliphatic polymeric esters, aromatic polymeric esters, polyesters, ester terminated poly butylene adipates, sulfonamides, and mixtures thereof.

In certain embodiments of this disclosure, the amount of plasticizer in the thermoplastic vulcanizate is from 4 parts to 35 parts, 4 parts to 20 parts or 6 parts to 18 parts based on 100 parts by weight of the plastic and rubber phases.

In certain embodiments of this disclosure, the plasticizer is capable of functioning as a plasticizer for one or both of the plastic phase or rubber phase at the plastic melt temperature.

In certain embodiments of this disclosure, the addition type curing agent is a multifunctional oxazoline or epoxide.

In certain embodiments of this disclosure, the thermoplastic vulcanizate comprises from 0.5 parts to 15 parts, 1 part to 12 parts or 1 part to 8 parts based on 100 parts by weight of the plastic and rubber phases, of the addition type curing agent.

In certain embodiments of this disclosure, the addition type curing agent is 2,2'-(1,3-phenylene)bis(2-oxazoline), or 2,2'-(1,4-phenylene)bis(2-oxazoline), or 2,2'-(2,6-pyridylene)bis(2-oxazoline), or mixtures thereof. In certain embodiments of this disclosure, the semi-crystalline engineering polyester is a poly (butylene terephthalate), poly (trimethylene terephthalate), poly (ethylene terephthalate), or mixture thereof; and/or wherein the semi-crystalline copolyester elastomer comprises crystalline segments derived from poly(butylene terephthalate), and the elastomeric segments are derived from poly (dimethylene oxide), poly (trimethylene oxide), poly (tetramethylene oxide), or mixtures thereof, and the semi-crystalline copolyester elastomer has a hardness from Shore D 70 to Shore D 85.

In certain embodiments of this disclosure, the aliphatic polyamide is a polycaprolactam, polylaurolactam, poly(11-aminoundecanoic acid), a polyamide derived from hexamethylenediamine and adipic acid, poly(hexamethylene adipamide-co-caprolactam, or a mixture thereof.

In certain embodiments of this disclosure, the plasticizer is an ester terminated poly (1,3-butylene adipate) and the thermoplastic vulcanizate comprises 4 to 20 parts, based on 100 parts by weight of the plastic and rubber phases, of the plasticizer.

In certain embodiments of this disclosure, the plasticizer is a diester terminated poly ethylene glycol or monomeric ether ester or aliphatic polymeric ester or aromatic polymeric ester, and the thermoplastic vulcanizate comprises 4 to 35 parts, based on 100 parts by weight of the plastic and rubber phases, of the plasticizer.

In certain embodiments of this disclosure, the plasticizer is N-(n-butyl)benzenesulfonamide and the thermoplastic vulcanizate comprises 4 to 35 parts, based on 100 parts by weight of the plastic and rubber phases, of the plasticizer, or the plasticizer is methyl 4-hydroxybenzoate and the thermoplastic vulcanizate comprises 4 to 20 parts of the plasticizer.

In certain embodiments of this disclosure, the carboxylated nitrile rubber has a copolymerized nitrile content of 15 to 50 weight percent of the rubber, and the copolymerized acid crosslinking site is 1 to 10 weight percent of the rubber.

In certain embodiments of this disclosure, the thermoplastic vulcanizate further comprises a cure accelerator selected from aryl phosphites, alkyl phosphites, aryl/alkyl phosphite, and mixtures thereof.

Use

The thermoplastic vulcanizate compositions of this disclosure can be used in applications wherever nitrile rubber is used. The thermoplastic vulcanizates disclosed herein may be formed into a variety of products, including for example gaskets, tubes, hose, boots, seals, vibration dampeners, stators, fittings, housings, cases, films, shock absorbers, anti-vibration mounts, couplings, bushings, sleeves, bellows, foams, etc. The thermoplastic vulcanizates disclosed herein are particularly useful for manufacturing tubes and hoses comprising at least one layer comprising thermoplastic vulcanizate. The thermoplastic vulcanizates disclosed herein are particularly useful for use in automobiles.

Thus, they can be utilized as seals, as gaskets, hoses, boots, and the like, especially for automotive applications. The invention will be better understood by reference to the following examples which serve to illustrate, but not to limit, the present invention.

Process

This disclosure also provides processes for producing thermoplastic vulcanizate. In certain embodiments, the processes comprise mixing a composition comprising a plastic phase and a rubber phase with an addition type curing agent. The mixing is typically carried out under conditions of shear and at a temperature above the melting point of the plastic phase.

This invention is best practiced using equipment that can blend polymeric materials at a shear rate that permits intimate material melt blending, but at a shear rate that is low enough to prevent excessive material thermal and thermo-oxidative degradation, and also mechano-chemical degradation, due to shearing forces. The residence time (about 1-2 minutes) of the polymer melt blend in the production equipment is also comparable to that used in commercially viable TPV manufacturing processes.

Adequate process temperature control and polymer melt blending using minimal shearing of the polymer melt blend is advantageous. The TPVs disclosed herein can be prepared using corotating or counter rotating twin screw extruders (TSEs), with elements that allow excellent polymer melt blending at low shear rate conditions ($<5000$ $s^{-1}$).

A particularly suitable single screw extruder for preparation of the TPVs of this invention is the Buss Kneader. Here, a reciprocating single screw, where the screw shaft consists of different elements (kneading, conveying, etc.) shears the polymer melt blend by the action of the screw elements on fixed (but adjustable) pins on the extruder barrel. Thus, intense polymer melt blending can be achieved at a low shear rate ($<1100$ $s^{-1}$), resulting in excellent polymer melt temperature control. Owing to the low shear rate profile of the Buss when compared to TSEs, the former machine is much less torque limited than the latter.

The plastic phase useful in the processes comprises from about 35 parts to about 95 parts by weight, based on 100 parts by weight of the plastic and rubber phases, of
i) a semi-crystalline engineering polyester;
ii) a semi-crystalline copolyester elastomer,
iii) a semi-crystalline aliphatic polyamide, or a mixture thereof.
or mixtures thereof.

The materials of the plastic phase are those described hereinabove.

Then rubber phase useful in the processes for preparing the thermoplastic vulcanizate comprises from about 65 parts to about 5 parts, by weight based on 100 parts by weight of the plastic and rubber phases, of a carboxylated nitrile rubber. Suitable materials for use as the rubber phase are those described hereinabove.

A desirable degree of cross-linking, i.e., partial or complete, can be achieved by adding one or more of the above-noted rubber curatives to the blend of a thermoplastic or the thermoplastic elastomer and carboxylated nitrile rubber and vulcanizing the rubber to the desired degree under conventional vulcanizing conditions, preferably using dynamic vulcanization. Dynamic vulcanization is affected by mixing the thermoplastic vulcanizate components at elevated temperature in conventional mixing equipment such as roll mills, Banbury mixers, Brabender mixers, continuous mixers, mixing extruders, and the like. The unique characteristic of dynamically cured compositions is that, notwithstanding the fact that the rubber component is partially or fully cured, the compositions can be processed and reprocessed by conventional plastic processing techniques such as extrusion, injection molding, blow molding and compression molding. Scrap or flashing can be salvaged and reprocessed.

In certain embodiments of the processes disclosed herein, the rubber phase and the plastic phase are melt blended prior to the addition of the addition type curing agent.

In certain embodiments of the processes disclosed herein, the rubber phase and the plastic phase are melt blended while the curing agent is added to the composition.

In certain embodiments of the processes disclosed herein, the process comprises:
  prior to melt blending with the rubber, melt blending the plastic phase with a predetermined amount of rubber curative to form a blend of curing agent and plastic;
  mixing the blend of curing agent and plastic with the rubber phase to form a blend of plastic phase and rubber phase, and
  adding additional curing agent to the blend of rubber phase and plastic phase with continued melt mixing.

Melt blending the plastic phase with a predetermined amount of rubber curative, i.e., forming a blend of curing agent and plastic, acts to functionalize the plastic acid end groups and to minimize plastic chain extension and residual rubber curing agent in the plastic phase.

In certain embodiments of the processes disclosed herein, the maximum shear rate in the process is less than 10,000 $s^{-1}$, or 7000 $s^{-1}$ or 3000 $s^{-1}$. In other embodiments, the maximum shear rate is less than 5000 $s^{-1}$.

In certain embodiments of the processes disclosed herein, the composition is prepared by melt blending the plastic phase with the curing agent to form a plastic phase/curing agent blend, and melt blending the plastic phase/curing agent blend with the rubber phase.

In certain embodiments of the processes disclosed herein, the composition further comprises a cure accelerator selected from aryl phosphites, alkyl phosphites, aryl/alkyl phosphite, and mixtures thereof. Particular cure accelerators suitable for use in the processes disclosed herein are selected from tris(2,4-di-t-butylphenyl) phosphite, bis(2,4-di-t-butylphenyl)pentaerythritol diphosphite, and mixtures thereof.

In certain embodiments of the processes disclosed herein, the cure accelerator is added to the mixture at any time during the process.

In certain embodiments of the processes disclosed herein, a plasticizer as described above can be introduced as plasticizer when convenient and appropriate during the process.

In certain embodiments, the thermoplastic vulcanizate described herein is prepared by dynamically crosslinking a melt blend with an addition type curing agent, wherein the melt blend comprises the plastic phase and the rubber phase, and wherein the crosslinks are formed by a reaction between an oxazoline curing agent and reactive groups in the carboxylated nitrile rubber.

In another aspect, this disclosure provides a thermoplastic elastomer comprising a plastic phase and a rubber phase, wherein
  a) the plastic phase comprises from 35 parts to 95 parts by weight, based on 100 parts by weight of the plastic and rubber phases, of a plastic having a melting point of 160° C. to 260° C., wherein the plastic is
    i) a semi-crystalline engineering polyester,
    ii) a semi-crystalline copolyester elastomer,
    iii) a semi-crystalline aliphatic polyamide, or a mixture thereof; and
  b) the rubber phase comprises from 65 parts to 5 parts, by weight based on 100 parts by weight of the plastic and rubber phases, of a carboxylated nitrile rubber; and
  c) optionally the elastomer comprises crosslinks between reactive groups in the carboxylated nitrile rubber.

In a further aspect, this disclosure provides a gasket, tube, hose, seal, vibration dampener, stator, fitting, housing, case, film, shock absorber, anti-vibration mount, coupling, bushing, sleeve, or bellows, or foam comprising a thermoplastic vulcanizate according the claims herein or a thermoplastic elastomer according to the claims herein.

In still another aspect, this disclosure provides a process for producing a thermoplastic vulcanizate comprising mixing a composition comprising a plastic phase and a rubber phase with an addition type curing agent, wherein the mixing is carried out under conditions of shear and at a temperature above the melting point of the plastic phase, and wherein
  the plastic phase comprises from 35 parts to 95 parts by weight, based on 100 parts by weight of the plastic and rubber phases, of a plastic having a melting point of 160° C. to 260° C., wherein the plastic is
  a semi-crystalline engineering polyester,
  a semi-crystalline copolyester elastomer, or
  a semi-crystalline aliphatic polyamide, or mixtures thereof; and
  the rubber phase comprises from 65 parts to 5 parts, by weight based on 100 parts by weight of the plastic and rubber phases, of a carboxylated nitrile rubber.

In certain embodiments, the process comprises: prior to melt blending with the rubber, melt blending the plastic phase with a predetermined amount of addition type curing agent to form a blend of curing agent and plastic; mixing the blend of curing agent and plastic with the rubber phase to form a blend of plastic phase and rubber phase.

In certain embodiments, the process further comprises adding additional addition type curing agent to the blend of rubber phase and plastic phase with continued melt mixing.

In certain embodiments, the composition is prepared by melt blending the plastic phase with the curing agent to form a plastic phase/curing agent blend, and melt blending the plastic phase/curing agent blend with the rubber phase.

The present invention will be better understood by reference to the following examples, which serve to illustrate, but not limit, the practice of this invention.

EXAMPLES

General Procedure

FIG. 1 is a diagram of the barrels of a twin-screw extruder suitable for use in the following examples. The equipment blends polymeric materials at a shear rate that permits intimate material melt blending, but at a shear rate that is low enough to prevent excessive material thermal and thermo-oxidative degradation, and also mechano-chemical degradation, due to shearing forces. The residence time of the polymer melt blend in the production equipment is about 2 minutes.

Plastic pellets and granulated rubber (dusted with clay) are fed into the throat of a 26 mm co-rotating twin screw extruder. After intimate rubber and plastic melt blending is achieved, addition type curing agent (1,3-PBO or 2,6-PyBO) is fed into the polymer melt blend with intensive mixing which initiates the dynamic vulcanization process. Precautions (barrel cooling, screw design) are taken to limit shear heating (due to the viscous drag of the molten plastic over the newly formed cross-linked rubber particles) in the dynamic vulcanization zone as the XNBR is broken up into cross-linked particulate rubber, about 1 μm to 10 μm in diameter.

When used, plasticizer may be added to the polymer melt blend prior to dynamic vulcanization for temperature control, provided that curative dilution due to plasticizer addition does not preclude completion of cure in the dynamic vulcanization zone. Alternatively, part or all of the plasticizer can be added downstream after completion of dynamic vulcanization.

The curing agent, typically a powder, can be supplied directly to the extruder feed throat. Alternatively, the curing agent can be supplied as a powder coating or dusting on the rubber granules. As another alternative, the curing agent may also be melt blended with the plastic phase, pelletized, and the resulting pellets consisting of a blend of curing agent and plastic can subsequently be used for TPV preparation. Melt blending the curing agent with the plastic prior to mixing with the rubber permits the curative to end-functionalize the carboxylic acid moieties of the plastic macromolecules which compatibilizes the plastic with the rubber and limits chain extension of the plastic macromolecules.

Both 1,3-PBO and 2,6-PyBO react with the acid functionality that is pendent to the rubber backbone to form an ester-amide cross-links. Both Nylons and polyesters also get linked to the rubber by selective reaction of the curative with only the end acid functionality of these plastic macromolecules, that is, neither the amine end groups of Nylons nor the hydroxyl end groups of polyesters exhibit notable reactivity with 1,3-PBO under the reaction conditions.

Materials

Rubber Material

| Trade Name | Description |
|---|---|
| Nipol 1072X28 | Zeon Chemicals, Baled rubber, ~27 wt % bound acrylonitrile, ~0.08 equivalents carboxylic acid per 100 parts rubber, 50-60 wt % gel in methyl ethyl ketone. ML(1 + 4, 100° C.) = 35-55 |
| Krynac X750 | Arlanxeo, Baled Rubber, 25.5-28.5 wt % bound acrylonitrile, ML(1 + 4, 100° C.) = 42-52 |

Plastic Material

| Trade Name | Description |
|---|---|
| Ultramid B33 01 | BASF: (Pellets) Nylon 6, m.p. = 220° C., Intermediate molecular weight product, relative viscosity (1 wt % in 96 wt % $H_2SO_4$ @ 23° C.): 3.3. |
| Rilsan BESNO TL | Arkema: (Pellets) Nylon 11, m.p. = 189° C., Melt Volume Rate ($cm^3$/10 min@235° C./2.16 kg): 1. |
| Rilsan AESNO TL | Arkema: (Pellets) Nylon 12, m.p. = 180° C., Melt Volume Rate ($cm^3$/10 min@235° C./5 kg): 8. |
| Valox 315 | SABIC: (Pellets) Poly(butylene terephthalate) Melt Volume Rate ($cm^3$/10 min@250° C./2.16 kg): 11.70, m.p. = 223° C. |
| Ultradur B6550 | BASF: (Pellets) Poly(butylene terephthalate) Melt Volume Rate ($cm^3$/10 min@250° C./2.16 kg): 9, m.p. = 220-230° C. |

Processing Aid

| Trade Name | Description |
|---|---|
| Bondyram 1101 | POLYRAM: (Pellets) Polypropylene-g-maleic anhydride (1 wt %), Melt Flow Index(190° C., 2.16 kg) = 170 |
| Bondyram 5108 | POLYRAM: (Pellets) High density polyethylene-g-maleic anhydride (0.9 wt %), Melt Flow Index(190° C., 2.16 kg) = 8 (Bondyram 5108 is equivalent to Polybond 3009 which is disclosed in U.S. Pat. No. 6,020,427) |

Plasticizer

| Trade Name | Description |
|---|---|
| Uniplex 214 | LANXESS: (Liquid) N-n-butylbenzene sulfonamide, b.p. 314° C. (BBSA). |
| TegMer 810 | HALLSTAR: (Liquid) Polyethylene glycol di-2-ethylhexyl ester, b.p. = 300° F. |
| PN-250 | AMFINE: (liquid) Ester terminated poly (1,3-butylene) adipate. Freezing point: −20° C. TGA (Air): 10° C./min heating rate, 5 wt % loss by 278° C. |
| TegMeR 39-N | HALLSTAR: (Liquid) Polyethylene glycol 200 monooleate, b.p. = 260° C. |
| TegMeR 804S | HALLSTAR: (Liquid) PEG Ester, b.p. = 260° C. |
| Plasthall TOTM | HALLSTAR: (Liquid) Trioctyl trimellitate, b.p. = 283° C. |
| TP-95 | HALLSTAR: (Liquid) Bis(2-(2-Butoxyethoxy)Ethyl) Adipate |
| TP-90B | HALLSTAR: (Liquid) Hexaoxatricosane, b.p. = 285° C. |

Curing Agent

| Trade Name | Description |
|---|---|
| 1,3-PBO | EVONIK: (Powder) 2,2'-(1,3-Phenylene)bis (oxazoline-2), m.p. = 147° C.-151° C. |

Antioxidant

| Trade Name | Description |
|---|---|
| Antioxidant 405 | AKROCHEM: (Powder) 4,4'-Bis-(α,α-dimethylbenzyl)diphenylamine |
| Irganox B225 | BASF: (Powder) Blend of Irgafos 168 and Irganox 1010. Irgafos 168 - Tris(2,4-ditert-butylphenyl) phosphite. Irganox 1010 - Pentaerythritol tetrakis(3-(3,5-di-tert-butyl-4-hydroxyphenyl) propionate) |

TPV Compounding/Extrusion

The Nylon or PBT/XNBR TPVs of this disclosure can be compounded in a batch mixer (e.g. RSI's Techmix 6) or a in continuous twin-screw extruder (e.g. Coperion ZSK 26) or a reciprocating kneader (e.g. BUSS Kneader MX-30).

TPVs of this disclosure made with nylon or PBT and XNBR are reactively compounded on a ZSK 26 mm, 10-barrel, co-rotating, Coperion two-lobe twin screw extruder having a L/D=40 and barrels such as those shown in FIG. 1. The maximum torque per screw shaft for this extruder is 106 Nm, the maximum allowable horsepower is 36 HP, and the maximum allowable screw speed is 1200 RPM.

The barrels of this extruder are:

Barrel #1 (Unheated): Conveying elements

Barrel #s 2-3: Kneading elements to melt plastic materials and to produce an intimate rubber and plastic melt blend.

Barrel #s 4-8: Dynamic vulcanization zone: a combination of kneading elements ensures intensive polymer melt blending during dynamic vulcanization, while limiting rise in polymer melt blend temperature and pressure.

Barrel #s 9-10: Conveying elements.

Die: 3-hole

Material is fed into the extruder at an appropriate rate and screw speed selected to permit sufficient residence time for dynamic vulcanization to take place.

Plastic pellets and clay-dusted granulated rubber are fed into the hopper attached to barrel #1. Curing agent, 1,3-PBO, and Antioxidant 405, both as powders, are either fed together into barrel #4 via a side feeder or antioxidant into barrel #1 and curative into the melt blend of plastic/curative (prepared as described below).

Barrel temperatures are selected based on melting points and/or softening points of the plastic and other TPV components. Barrel temperatures should be adjusted to avoid component decomposition.

After extrusion, strands are water cooled, pelletized, and dried.

Barrels #4 and #9 are vented to the atmosphere, and the screw design facilitates the formation of a melt seal on both sides of these barrels.

Preparation of Pellets Consisting of a Blend of Curing Agent and Plastic

Melt blends of thermoplastic pellets and the curative powder are made with a low-intensity mixing screw, with barrel set temperatures low enough to just melt the resin and mix with the powder. Plastic pellets are fed into the extruder feed throat, while the powder is added though the side feeder.

Laboratory Batch Mixer

A Techmix 6 (RSI) or Haake Rheomix™ 3000 (Thermofisher) mixer with three heating zones is used and connected to an ATR Plasti-Corder (C. W. Brabender) torque rheometer for temperature and torque control. The three zones and the stock temperature are set at temperatures above the melting point of the plastic phase. The mixing conditions are as follows: 5-15 minutes of total mixing time, 65% fill factor, 50-150 RPM rotor speed for Banbury rotors. The plastic and the rubber are first added to the mixer and then the curative, the antioxidant, the plasticizer, and the other components (if any) can be added at any time during the mixing process.

Single Screw Extrusion

TPV pellets are extruded into tapes using a single screw extruder, for physical property and process-ability testing. Tensile dumbbells are cut from the tapes. TPV pellets are also injection molded into tensile bars, flex bars, and compression set buttons.

A Brabender single screw extruder (L/D=25, ¾" screw) is used and connected to an RS-5000 (RSI) torque rheometer for temperature and torque control. The extruder includes three heated zones (barrels set at 235° C.), with the die temperature set at 245° C. The screw consists of a small Maddock mixing section, with the remaining sections being built-up of conveying elements.

Injection Molding

A Sumitomo Systec 90-310 injection molding machine having three heated zones (barrel set temperatures: 235° C., 240° C., and 245° C., with nozzle set at 250° C. is used for injection molding. Screw speed is 150 rpm, with different formulation dependent holding pressures, typically between 11-18 MPa.

Compression Molding Machine

A Wabash MPI's Genesis Series Hydraulic Press with heated and water-cooled steel platens is used for compression molding the samples into plaques. The TPV sample is first pressed for 2-5 minutes between the heated platens at temperatures above the melting point of the plastic phase, and for 2-5 minutes between the water-cooled plates.

Property Testing

Tensile (5 specimens), flexural modulus (3 specimens), hardness (5 measurements) and compression set (3 specimens) tests are conducted according to ASTM D638, ASTM D790, ASTM D2240, and ASTM D395 respectively. In all cases, the median test value is reported.

All quantities shown in the below tables are weight percentages unless otherwise specified. Although processing aids such as Bondyram 1101 and 5108 can be considered plastic materials, they are not counted in the calculations of the relative amounts of plastic in the formulations described below.

Example 1

Plasticized TPV formulations compounded using Valox 315 (Poly(butylene terephthalate), 45 parts) and XNBR (Nipol 1072X28, 55 parts), with 1,3-PBO as curing agent, with and without a maleic anhydride grafted high density polyethylene (Bondyram 5108) as process aid, are shown below in Table 1. The properties of these formulations and the processing conditions used to produce them are also presented in Table 1.

TABLE 1

Formulations in Weight % for Valox 315/Nipol 1072X28 TPVs.

|  | Thermoplastic Vulcanizate (TPV) formulation Formulation No. | | | |
| --- | --- | --- | --- | --- |
|  | 1 | 2 | 3 | 4 |
| Valox 315 | 38.96 | 37.14 | 36.44 | 34.84 |
| PBO | 4.76 | 4.54 | 4.45 | 4.26 |
| Nipol 1072X28 | 47.62 | 45.39 | 44.53 | 42.58 |
| Antioxidant 405 | 1.73 | 1.65 | 1.62 | 1.55 |
| Bondyram 5108 | 0.00 | 4.67 | 0.00 | 4.38 |
| TegMeR 810 | 0.00 | 0.00 | 12.96 | 12.39 |
| PN-250 | 6.93 | 6.60 | 0.00 | 0.00 |
| Property |  |  |  |  |
| Tape Extruded: Tensile Strength @ RT (MPa) | 19.72 | 19.25 | 16.96 | 18.21 |
| Tape Extruded: Elongation @ RT (%) | 184.2 | 201 | 167.1 | 185.6 |

TABLE 1-continued

Formulations in Weight % for Valox 315/Nipol 1072X28 TPVs.

| | Thermoplastic Vulcanizate (TPV) formulation Formulation No. | | | |
|---|---|---|---|---|
| | 1 | 2 | 3 | 4 |
| Injection Molded: Tensile Strength @ RT (MPa) | 16.47 | 16.52 | 12.10 | 13.58 |
| Injection Molded: Elongation @ RT (%) | 75.70 | 73.50 | 65.30 | 74.10 |
| Injection Molded: Tensile Strength @ 150° C. (MPa) | 4.74 | 5.32 | 4.03 | 4.77 |
| Injection Molded: Elongation @ 150° C. (%) | 26.00 | 36.50 | 22.80 | 37.00 |
| Injection Molded: Flexural Modulus @ RT (MPa) | 190.34 | 201.19 | 121.23 | 119.80 |
| Injection Molded: Compression Set @150° C., 70 hr (%) | 67.33 | 69.64 | 69.18 | 66.67 |
| Twin-Screw Processing Conditions | | | | |
| Screw Speed Range (RPM) | 100-300 | 100-300 | 100-300 | 100-300 |
| Feed rate Range (lb/hr) | 15-40 | 15-40 | 15-40 | 15-40 |
| Average Torque (%) | 80 | 88 | 87 | 88 |

The data in Table 1 demonstrate that no significant improvement in TPV physical properties is achieved using a process aid (Bondyram 5108). Similarly, no significant improvement in the process-ability is achieved with a process aid. (See machine torque listed in Table 1).

Example 2

Preparation of TPV formulations to have compositions similar to those set forth in Table 1 above but without any plasticizer results in materials that exhibits severe melt fracture which caused broken TPV strands to exit the die, regardless of whether the formulations included Bondyram 5108. In addition, during compounding with the ZSK 26 mm twin screw extruder, the maximum torque was reached. However, use of an extruder such as, for example, a Buss kneader, produces an acceptable TPV melt with these formulations.

Example 3

TPV formulations compounded using Ultramid B33 01 (Nylon 6, 45 parts) and XNBR (Nipol 1072X28, 55 parts), with 1,3-PBO as curing agent, with and without a plasticizer (BBSA), are shown below in Table 2. The properties of these formulations and the processing conditions used to produce them are also presented in Table 2.

TABLE 2

Formulations in Weight % for Ultramid B33 01/Nipol 1072X28 TPVs.

| | Thermoplastic Vulcanizate (TPV) formulation Formulation No. | | |
|---|---|---|---|
| | 5 | 6 | 7 |
| Ultramid B33 01 | 44.03 | 40.83 | 40.63 |
| PBO | 2.15 | 2.00 | 2.48 |
| Nipol 1072X28 | 53.82 | 49.91 | 49.66 |
| BBSA | 0.00 | 7.26 | 7.22 |
| Property | | | |
| Injection Molded: Tensile Strength @ RT (MPa) | 28.48 | 23.11 | 23.94 |
| Injection Molded: Elongation @ RT (%) | 99 | 96 | 98 |
| Injection Molded: Tensile Strength @ 150° C. (MPa) | 9.02 | 7.42 | 7.46 |
| Injection Molded: Elongation @ 150° C. (%) | 47.3% | 41.8% | 40.8% |
| Injection Molded: Flexural Modulus @ RT (MPa) | 501.52 | 320.95 | 394.47 |
| Injection Molded: Compression Set @150° C., 70 hr (%) | 84.32 | 83.04 | 85.85 |
| Twin-Screw Processing Conditions | | | |
| Screw Speed Range (RPM) | 100-300 | 100-300 | 100-300 |
| Feed rate Range (lb/hr) | 15-40 | 15-40 | 15-40 |
| Average Torque (%) | 91 | 89 | 92 |

Example 4

Preparation of TPV formulation to have composition similar to formulation #7 in Table 2 above but without any plasticizer results in material that exhibited severe melt fracture which caused broken TPV strands to exit the die, regardless of whether the formulation included Bondyram 5108. In addition, during compounding with the ZSK 26 mm twin screw extruder, the maximum torque was reached. However, use of an extruder such as, for example, a Buss kneader, produces an acceptable TPV melt with this formulation with higher curative level than formulation #5.

Example 5

TPV formulations compounded using Rilsan BESNO TL (Nylon 11, 45 parts) and XNBR (Nipol 1072X28, 55 parts), with 1,3-PBO as curing agent, with and without a plasticizer (BBSA), are shown below in Table 3. The properties of these formulations and the processing conditions used to produce them are also presented in Table 3.

TABLE 3

Formulations in Weight % for Rilsan BESNO TL/Nipol 1072X28 TPVs.

| | Thermoplastic Vulcanizate (TPV) formulation Formulation No. | | | |
|---|---|---|---|---|
| | 8 | 9 | 10 | 11 |
| Rilsan BESNO TL | 44.03 | 40.83 | 43.80 | 40.63 |
| PBO | 2.15 | 2.00 | 2.68 | 2.48 |
| Nipol 1072X28 | 53.82 | 49.91 | 53.53 | 49.66 |
| BBSA | 0.00 | 7.26 | 0.00 | 7.22 |
| Property | | | | |
| Injection Molded: Tensile Strength @ RT (MPa) | 21.02 | 17.26 | 21.29 | 16.66 |

TABLE 3-continued

Formulations in Weight % for Rilsan BESNO TL/Nipol 1072X28 TPVs.

| | Thermoplastic Vulcanizate (TPV) formulation Formulation No. | | | |
|---|---|---|---|---|
| | 8 | 9 | 10 | 11 |
| Injection Molded: Elongation @ RT (%) | 76 | 83 | 69 | 75 |
| Injection Molded: Tensile Strength @ 150° C. (MPa) | 5.49 | 4.68 | 5.89 | 4.65 |
| Injection Molded: Elongation @ 150° C. (%) | 34.3 | 34.5 | 33.9 | 30.5 |
| Injection Molded: Flexural Modulus @ RT (MPa) | 253.6 | 125.93 | 246.35 | 125.22 |
| Injection Molded: Compression Set @150° C., 70 hr (%) | 88.56 | 85.25 | 84.44 | 86.81 |
| Twin-Screw Processing Conditions | | | | |
| Screw Speed Range (RPM) | 100-300 | 100-300 | 100-300 | 100-300 |
| Feed rate Range (lb/hr) | 15-40 | 15-40 | 15-40 | 15-40 |
| Average Torque (%) | 91 | 85 | 91 | 87 |

Example 6

TPV formulations compounded using Rilsan AESNO TL (Nylon 12, 45 parts) and XNBR (Nipol 1072X(28, 55 parts), with 1,3-PBO as curing agent, with and without plasticizer (BBSA), are shown below in Table 4. The properties of these formulations and the processing conditions used to produce them are also presented in Table 4.

TABLE 4

Formulations in Weight % for Rilsan AESNO TL/Nipol 1072X28 TPVs.

| | Thermoplastic Vulcanizate (TPV) formulation Formulation No. | | | |
|---|---|---|---|---|
| | 12 | 13 | 14 | 15 |
| Rilsan AESNO TL | 44.03 | 40.83 | 43.80 | 40.63 |
| PBO | 2.15 | 2.00 | 2.68 | 2.48 |
| Nipol 1072X28 | 53.82 | 49.91 | 53.53 | 49.66 |
| BBSA | 0.00 | 7.26 | 0.00 | 7.22 |
| Property | | | | |
| Injection Molded: Tensile Strength @ RT (MPa) | 20.13 | 16.20 | 20.19 | 15.77 |
| Injection Molded: Elongation @ RT (%) | 56 | 71 | 61 | 73 |
| Injection Molded: Tensile Strength @ 150° C. (MPa) | 5.14 | 3.57 | 4.49 | 3.25 |
| Injection Molded: Elongation @ 150° C. (%) | 29.8 | 26.7 | 28.8 | 20.8 |
| Injection Molded: Flexural Modulus @ RT (MPa) | 280.35 | 125.15 | 250.16 | 114.88 |
| Injection Molded: Compression Set @150° C., 70 hr (%) | 93.29 | 89.16 | 87.63 | 90.81 |
| Twin-Screw Processing Conditions | | | | |
| Screw Speed Range (RPM) | 100-300 | 100-300 | 100-300 | 100-300 |
| Feed rate Range (lb/hr) | 15-40 | 15-40 | 15-40 | 15-40 |
| Average Torque (%) | 92 | 92 | 94 | 93 |

Example 7

Plasticized TPV formulations compounded using Valox 315 (Poly(butylene terephthalate)) and XNBR (Nipol 1072X28) at different rubber/plastic ratios (5/95 and 30/70) and curative (1,3-PBO) levels and without any processing aid are shown below in Table 5. The properties of these formulations and the processing conditions used to produce them are also presented in Table 5.

TABLE 5

Formulations in Weight % for Valox 315/Nipol 1072X28 TPVs Without Using Any Processing Aid.

| | Thermoplastic Vulcanizate (TPV) formulation Formulation No. | | | |
|---|---|---|---|---|
| | 16 | 17 | 18 | 19 |
| Valox 315 | 80.85 | 79.83 | 61.14 | 58.82 |
| PBO | 0.85 | 1.68 | 1.31 | 2.52 |
| Nipol 1072X28 | 4.26 | 4.20 | 26.20 | 25.21 |
| Antioxidant 405 | 0.43 | 0.84 | 2.62 | 5.04 |
| TegMeR 810 | 13.62 | 13.45 | 8.73 | 8.40 |
| Property | | | | |
| Tape Extruded: Tensile Strength @ RT (MPa) | 30.00 | 27.34 | 25.68 | 26.25 |
| Tape Extruded: Elongation @ RT (%) | 201.00 | 166.00 | 220.00 | 219.00 |
| Injection Molded: Tensile Strength @ RT (MPa) | 34.32 | 34.40 | 26.25 | 24.85 |
| Injection Molded: Elongation @ RT (%) | 220.30 | 223.30 | 132.00 | 127.80 |
| Injection Molded: Tensile Strength @ 150° C. (MPa) | 21.19 | 21.46 | 10.96 | 10.59 |
| Injection Molded: Elongation @ 150° C. (%) | 289.20 | 304.50 | 89.50 | 108.10 |
| Injection Molded: Flexural Modulus @ RT (MPa) | 647.57 | 686.73 | 433.62 | 366.45 |
| Injection Molded: Compression Set @150° C., 70 hr (%) | 80.24 | 81.91 | 75.60 | 75.13 |
| Hardness, Instantaneous (Shore A) | 90.00 | 90.90 | 90.50 | 92.00 |
| Hardness, Instantaneous (Shore D) | 62.40 | 62.30 | 54.30 | 53.80 |
| Twin-Screw Processing Conditions | | | | |
| Screw Speed Range (RPM) | 100-300 | 100-300 | 100-300 | 100-300 |
| Feed rate Range (lb/hr) | 15-50 | 15-50 | 15-50 | 15-50 |
| Average Torque (%) | 80 | 77 | 85 | 78 |

Table 5 demonstrates the formulations and the properties for the lower amount of rubber (XNBR) and the higher amount of plastic (PET), without using the processing aid.

Example 8

Plasticized TPV formulations compounded using Ultramid B33 01 (Nylon 6) and XNBR (Nipol 1072X28) at different rubber/plastic ratios (5/95 and 30/70) and curative (1,3-PBO) levels and without any processing aid, are shown below in Table 6. The properties of these formulations and the processing conditions used to produce them are also presented in Table 6.

TABLE 6

Formulations in Weight % for Ultramid B33 01/Nipol 1072X28 TPVs Without Using Any Processing Aid.

| | Thermoplastic Vulcanizate (TPV) formulation Formulation No. | | | |
|---|---|---|---|---|
| | 20 | 21 | 22 | 23 |
| Ultramid B33 01 | 83.70 | 82.61 | 61.14 | 58.82 |
| PBO | 0.88 | 1.74 | 1.31 | 2.52 |

TABLE 6-continued

Formulations in Weight % for Ultramid B33 01/Nipol
1072X28 TPVs Without Using Any Processing Aid.

| | Thermoplastic Vulcanizate (TPV) formulation Formulation No. | | | |
|---|---|---|---|---|
| | 20 | 21 | 22 | 23 |
| Nipol 1072X28 | 4.41 | 4.35 | 26.20 | 25.21 |
| Antioxidant 405 | 0.44 | 0.87 | 2.62 | 5.04 |
| BBSA | 10.57 | 10.43 | 8.73 | 8.40 |
| Property | | | | |
| Tape Extruded: Tensile Strength @ RT (MPa) | 58.03 | 73.08 | 51.85 | 46.29 |
| Tape Extruded: Elongation @ RT (%) | 252.00 | 282.00 | 224.00 | 217.00 |
| Injection Molded: Tensile Strength @ RT (MPa) | 55.05 | 57.05 | 49.22 | 42.08 |
| Injection Molded: Elongation @ RT (%) | 186.00 | 167.10 | 118.00 | 111.90 |
| Injection Molded: Tensile Strength @ 150° C. (MPa) | 33.65 | 32.54 | 19.17 | 14.77 |
| Injection Molded: Elongation @ 150° C. (%) | 286.60 | 287.50 | 107.60 | 80.80 |
| Injection Molded: Flexural Modulus @ RT (MPa) | 1128.87 | 1025.95 | 727.05 | 750.10 |
| Injection Molded: Compression Set @150° C., 70 hr (%) | 84.51 | 80.81 | 89.71 | 89.62 |
| Hardness, Instantaneous (Shore A) | 91.00 | 87.10 | 90.20 | 86.60 |
| Hardness, Instantaneous (Shore D) | 71.00 | 65.40 | 63.10 | 56.40 |
| Twin-Screw Processing Conditions | | | | |
| Screw Speed Range (RPM) | 100-300 | 100-300 | 100-300 | 100-300 |
| Feed rate Range (lb/hr) | 15-50 | 15-50 | 15-50 | 15-50 |
| Average Torque (%) | 84 | 86 | 92 | 83 |

Table 6 demonstrates the formulations and the properties for the lower amount of rubber (XNBR) and the higher amount of plastic (Nylon 6), without using the processing aid.

Example 9

Plasticized TPV formulations using 1,3-PBO (curative) compounded using Valox 315 (Poly(butylene terephthalate)) and XNBR (Nipol 1072X28) at different rubber/plastic ratios (65/35 and 60/40) and Ultradur B6550 (Poly(butylene terephthalate), 40 parts) and XNBR (Nipol 1072X28, 60 parts), without any processing aid, are shown below in Table 7. The TPV formulations are prepared in the laboratory batch mixer. The formulations and physical properties of the resulting PBT/XNBR TPVs are shown below in Table 7.

TABLE 7

Formulations in Weight % for Valox 315/XNBR TPVs
and Ultradur B6550/XNBR TPVs Made on Laboratory
Mixer Without Using Any Processing Aid.

| | Thermoplastic Vulcanizate (TPV) Formulation Formulation No. | | |
|---|---|---|---|
| | 24 | 25 | 26 |
| Valox 315 | 29.41 | 33.83 | 0.00 |
| Ultradur B6550 | 0.00 | 0.00 | 33.83 |
| Nipol 1072X28 | 54.62 | 50.74 | 50.74 |
| PBO | 1.68 | 1.27 | 1.27 |
| Antioxidant 405 | 0.84 | 0.63 | 0.63 |
| TegMeR 810 | 13.45 | 13.53 | 13.53 |
| Property | | | |
| Compression Molded: Tensile Strength @ RT (MPa) | 7.57 | 8.11 | 4.38 |
| Compression Molded: Elongation @ RT (%) | 109.00 | 109.00 | 40.00 |
| Hardness, Instantaneous (Shore A) | 83.10 | 82.50 | 90.80 |
| Hardness, Instantaneous (Shore D) | 30.00 | 31.00 | 32.70 |

Table 7 demonstrates the formulations and the properties for the higher amount of rubber (XNBR) and the lower amount of plastic (PET), without using the processing aid. It can also be seen in Table 7 that the mechanical properties of the TPVs made with Ultradur B6550 (higher M.F.I.) are lower than the TPVs made with Valox 315 (lower M.F.I.).

Example 10

Plasticized TPV formulations compounded using Ultramid B33 01 (Nylon 6) and XNBR (Nipol 107228) at different rubber/plastic ratios (65/35 and 60/40) and curative (1,3-PBO) levels and without any processing aid, are shown below in Table 8. The TPV formulations are prepared in the laboratory batch mixer. The formulations and physical properties of the resulting Nylon 6/XNBR TPVs are shown below in Table 8.

TABLE 8

Formulations in Weight % for Ultramid B33 01 (Nylon 6)/XNBR TPVs
Made on Laboratory Mixer Without Using Any Processing Aid.

| | Thermoplastic Vulcanizate (TPV) Formulation Formulation No. | |
|---|---|---|
| | 27 | 28 |
| Ultramid B33 01 | 29.41 | 33.83 |
| Nipol 1072X28 | 54.62 | 50.74 |
| PBO | 1.68 | 1.27 |
| Antioxidant 405 | 0.84 | 0.63 |
| BBSA | 13.45 | 13.53 |
| Property | | |
| Compression Molded: Tensile Strength @ RT (MPa) | 14.73 | 12.01 |
| Compression Molded: Elongation @ RT (%) | 120.00 | 99.00 |
| Hardness, Instantaneous (Shore A) | 90.10 | 78.10 |
| Hardness, Instantaneous (Shore D) | 36.70 | 34.10 |

Table 8 demonstrates the formulations and the properties for the higher amount of rubber (XNBR) and the lower amount of plastic (Nylon 6), without using the processing aid.

Example 11

Plasticized TPV formulations compounded using Valox 315 (Poly(butylene terephthalate)) and XNBR (Nipol 1072X(28) at same rubber/plastic ratio (35/65) and curative (1,3-PBO) level using different plasticizers, are shown below in Table 9. The properties of these formulations and the processing conditions used to produce them are also presented in Table 9.

TABLE 9

Formulations in Weight % for Valox 315/Nipol 1072X28 TPVs Using Different Plasticizers.

| | Thermoplastic Vulcanizate (TPV) formulation Formulation No. | | | | |
|---|---|---|---|---|---|
| | 29 | 30 | 31 | 32 | 33 |
| Valox 315 | 55.91 | 55.91 | 55.91 | 55.91 | 55.91 |
| PBO | 3.01 | 3.01 | 3.01 | 3.01 | 3.01 |
| Nipol 1072X28 | 30.11 | 30.11 | 30.11 | 30.11 | 30.11 |
| Antioxidant 405 | 1.51 | 1.51 | 1.51 | 1.51 | 1.51 |
| TegMeR 39-N | 9.46 | 0.00 | 0.00 | 0.00 | 0.00 |
| TegMeR 804S | 0.00 | 9.46 | 0.00 | 0.00 | 0.00 |
| Plasthall TOTM | 0.00 | 0.00 | 9.46 | 0.00 | 0.00 |
| TP-95 | 0.00 | 0.00 | 0.00 | 9.46 | 0.00 |
| TP-90B | 0.00 | 0.00 | 0.00 | 0.00 | 9.46 |
| Property | | | | | |
| Injection Molded: Tensile Strength @ RT (MPa) | 24.45 | 22.75 | 25.19 | 25.05 | 22.79 |
| Injection Molded: Elongation @ RT (%) | 125.40 | 97.00 | 111.00 | 113.00 | 100.00 |
| Injection Molded: Tensile Strength @ 121° C. (MPa) | 11.76 | 11.00 | 11.39 | 11.91 | 11.26 |
| Injection Molded: Elongation @ 121° C. (%) | 75.10 | 58.60 | 62.30 | 70.00 | 61.30 |
| Injection Molded: Flexural Modulus @ RT (MPa) | 318.47 | 304.32 | 430.73 | 389.48 | 281.68 |
| Injection Molded: Compression Set @121° C., 70 hr (%) | 66.33 | 66.04 | 57.27 | 49.89 | 59.04 |
| Hardness, Instantaneous (Shore A) | 94.70 | 97.20 | 97.00 | 93.30 | 92.00 |
| Hardness, Instantaneous (Shore D) | 53.30 | 54.90 | 55.50 | 51.90 | 53.10 |
| Twin-Screw Processing Conditions | | | | | |
| Screw Speed Range (RPM) | 100-300 | 100-300 | 100-300 | 100-300 | 100-300 |
| Feed rate Range (lb/hr) | 15-50 | 15-50 | 15-50 | 15-50 | 15-50 |
| Average Torque (%) | 71 | 72 | 74 | 77 | 76 |

Table 9 demonstrates the formulations and the properties for Valox 315/Nipol 1072X28 TPVs using different plasticizers. A big difference in the values of flexural modulus can be seen, with the lowest value resulted from TP-901B, while the values for the tensile strength are close to each other, especially at 121° C.

Example 12

Plasticized TPV formulations compounded using Valox 315 (Poly(butylene terephthalate)) and Krynac X750 (XNBR) at two rubber/plastic ratios (35/65 and 45/55), are shown below in Table 10. Some formulations are with or without Valox 315/PBO (curative) blend, and some formulations are with or without process aid (Bondyram 5108 or 1101). The properties of these formulations and the processing conditions used to produce them are also presented in Table 10.

TABLE 10

Formulations in Weight % for Valox 315/Krynac X750 TPVs Made With or Without Valox 315/PBO Blend.

| | Thermoplastic Vulcanizate (TPV) formulation Formulation No. | | | | |
|---|---|---|---|---|---|
| | 34 | 35 | 36 | 37 | 38 |
| Valox 315 | 45.17 | 38.80 | 38.80 | — | — |
| Valox 315 + PBO Blend | — | — | — | 55.91 + 3.01 | 44.92 + 4.60 |
| PBO | 3.70 | 3.17 | 3.17 | — | — |
| Krynac X750 | 36.96 | 31.75 | 31.75 | 30.11 | 36.75 |
| Antioxidant 405 | 1.85 | 1.59 | 1.59 | 1.51 | 2.30 |
| Bondyram 1101 | — | 14.11 | — | — | — |
| Bondyram 5108 | — | — | 14.11 | — | — |
| TegMeR 810 | 12.32 | 10.58 | 10.58 | 9.46 | 11.43 |
| Property | | | | | |
| Injection Molded: Tensile Strength @ RT (MPa) | 14.99 | 17.56 | 17.25 | 23.78 | 17.56 |
| Injection Molded: Elongation @ RT (%) | 68.70 | 112.00 | 83.00 | 103.00 | 80.00 |
| Injection Molded: Tensile Strength @ 121° C. (MPa) | 7.71 | 8.16 | 7.23 | 11.07 | 8.44 |
| Injection Molded: Elongation @ 121° C. (%) | 37.80 | 79.60 | 53.50 | 51.40 | 48.30 |
| Injection Molded: Flexural Modulus @ RT (MPa) | 187.33 | 328.37 | 230.62 | 349.66 | 213.08 |
| Injection Molded: Compression Set @121° C., 70 hr (%) | 48.29 | 60.55 | 57.29 | 63.28 | 55.60 |
| Hardness, Instantaneous (Shore A) | 96.80 | 96.60 | 96.50 | 98.80 | 97.60 |
| Hardness, Instantaneous (Shore D) | 44.60 | 48.90 | 45.40 | 52.00 | 46.10 |
| Twin-Screw Processing Conditions | | | | | |
| Screw Speed Range (RPM) | 100-300 | 100-300 | 100-300 | 100-300 | 100-300 |
| Feed rate Range (lb/hr) | 15-50 | 15-50 | 15-50 | 15-50 | 15-50 |
| Average Torque (%) | 90 | 43 | 75 | 82 | 83 |

Table 10 demonstrates the formulations and the properties for Valox 315/Krynac X750 TPVs. For the formulations 35 and 36, the process aids, Bondyram 5108 and 1101, help to increase elongation and reduce the average machine torque (43% and 75% vs 90% for formulation 34), but the strands coming out of the die are rough and melt-fractured, unlike the smooth and very stable strands resulting from formulation 34. At the same time, the flexural modulus increases by adding the process aid, making the TPVs less flexible, which may not be desirable for some applications.

Example 13

Plasticized TPV formulations compounded using Valox 315 (Poly(butylene terephthalate)) and Nipol 1072X28 (XNBR), with 1,3-PBO as curing agent, with and without a maleic anhydride grafted high density polyethylene (Bondyram 5108) as process aid, are shown below in Table 11. These TPVs are prepared using the plastic pellets formed from a blend of curing agent and plastic described above. The formulations, physical properties, and processing conditions of PBT/XNBR TPVs are also shown below in Tables 11.

TABLE 11

Formulations in Weight % for Valox 315/HNBR TPVs Using Valox 315/PBO Blend.

| | Thermoplastic Vulcanizate (TPV) Formulation Formulation No. | | | |
|---|---|---|---|---|
| | 39 | 40 | 41 | 42 |
| Valox 315 + PBO Blend | 36.43 + 4.45 | 34.84 + 4.26 | 38.96 + 4.76 | 37.14 + 4.54 |
| Nipol 1072X28 | 44.53 | 42.58 | 47.62 | 45.40 |
| Antioxidant 405 | 1.62 | 1.55 | 1.73 | 1.65 |
| Bondyram 5108 | 0.00 | 4.38 | 0.00 | 4.67 |
| TegMeR 810 | 12.96 | 12.39 | 0.00 | 0.00 |
| PN-250 | 0.00 | 0.00 | 6.93 | 6.60 |
| Property | | | | |
| Injection Molded: Tensile Strength @ RT (MPa) | 12.51 | 12.91 | 16.39 | 16.01 |
| Injection Molded: Elongation @ RT (%) | 75.50 | 81.10 | 86.40 | 79.30 |
| Injection Molded: Tensile Strength @ 150° C. (MPa) | 4.71 | 4.54 | 5.62 | 5.13 |
| Injection Molded: Elongation @ 150° C. (%) | 34.00 | 39.40 | 36.10 | 38.80 |
| Injection Molded: Flexural Modulus @ RT (MPa) | 134.94 | 140.30 | 206.86 | 235.18 |
| Injection Molded: Compression Set @150° C., 70 hr (%) | 69.57 | 73.90 | 75.86 | 74.16 |
| Twin-Screw Processing Conditions | | | | |
| Screw Speed (RPM) | 100-300 | 100-300 | 100-300 | 100-300 |
| Feed rate (lb/hr) | 15-40 | 15-40 | 15-40 | 15-40 |
| Average Torque (%) | 86 | 84 | 88 | 88 |

Table 11 demonstrate that the formulations of Table 1 can be produced with 1,3-PBO being side-fed into the extruder, with similar process-ability, similar tensile strength and elongation values, although with higher values of flexural modulus and compression set.

Having described the thermoplastic vulcanizates and methods for preparing using the thermoplastic vulcanizates in detail and by reference to specific examples thereof, it will be apparent that modifications and variations are possible without departing from the scope of what is defined in the appended claims. More specifically, although some aspects of the present disclosure are identified herein as particularly advantageous, it is contemplated that the present disclosure is not necessarily limited to these particular aspects of the disclosure.

Itemized List of Embodiments:

1. A thermoplastic vulcanizate comprising a plastic phase and a rubber phase, wherein
   a) the plastic phase comprises from about 35 parts to about 95 parts by weight, based on 100 parts by weight of the plastic and rubber phases, of a plastic having a melting point of about 160° C. to about 260° C., wherein the plastic is
      i) a semi-crystalline engineering polyester,
      ii) a semi-crystalline copolyester elastomer,
      iii) a semi-crystalline aliphatic polyamide, or a mixture thereof; and
   b. the rubber phase comprises from about 65 parts to about 5 parts, by weight based on 100 parts by weight of the plastic and rubber phases, of a carboxylated nitrile rubber; and
   c. crosslinks between reactive groups in the carboxylated nitrile rubber.

2. A thermoplastic vulcanizate according to embodiment 1, wherein the crosslinks are formed by a reaction between an addition type curing agent and reactive groups in the carboxylated nitrile rubber.

3. A thermoplastic vulcanizate prepared by dynamically crosslinking a melt blend with an addition type curing agent, wherein the melt blend comprises a plastic phase and a rubber phase, and wherein
   the plastic phase comprises from about 35 parts to about 95 parts by weight, based on 100 parts by weight of the plastic and rubber phases, of a plastic having a melting point of about 160° C. to about 260° C., wherein the plastic is
      i) a semi-crystalline engineering polyester;
      ii) a semi-crystalline copolyester elastomer, or
      iii) a semi-crystalline aliphatic polyamide, or a mixture thereof; and
   the rubber phase comprises from about 65 parts to about 5 parts, by weight based on 100 parts by weight of the plastic and rubber phases, of a carboxylated nitrile rubber.

4. A thermoplastic vulcanizate according to any one of embodiments 1-3, wherein
   the plastic phase comprises about 40 parts to about 70 parts by weight, based on 100 parts by weight of the plastic and rubber phases, of a plastic, and the plastic has a melting point of about 160° C. to about 260° C. and is
      i) a semi-crystalline engineering polyester,
      ii) a semi-crystalline copolyester elastomer, or a mixture thereof, and
   the rubber phase comprises from about 60 parts to about 30 parts, by weight based on 100 parts by weight of the plastic and rubber phases, of the carboxylated nitrile rubber.

5. A thermoplastic vulcanizate according to any one of embodiments 1-3, wherein
   the plastic phase comprises about 70 parts to about 95 parts by weight, based on 100 parts by weight of the plastic and rubber phases, of the plastic, and the plastic has a melting point of about 160° C. to about 260° C. and is
      i) a semi-crystalline engineering polyester,
      ii) a semi-crystalline copolyester elastomer, or a mixture thereof, and
   the rubber phase comprises from about 30 parts to about 5 parts, by weight based on 100 parts by weight of the plastic and rubber phases, of the carboxylated nitrile rubber.

6. A thermoplastic vulcanizate according to any one of embodiments 1-3, wherein
   the plastic phase comprises about 35 parts to about 95 parts by weight, based on 100 parts by weight of the plastic and rubber phases, of a plastic, and the plastic has a melting point of about 160° C. to about 260° C. and is a semi-crystalline aliphatic polyamide, and
   the rubber phase comprises from about 65 parts to about 5 parts, by weight based on 100 parts by weight of the plastic and rubber phases, of the carboxylated nitrile rubber.

7. A thermoplastic vulcanizate according to any one of embodiments 1-6, further comprising a plasticizer.

8. A thermoplastic vulcanizate according to embodiment 7, wherein the plasticizer is melt miscible with the rubber phase and the plastic phase.

9. A thermoplastic vulcanizate according to embodiment 7 or 8, wherein the plasticizer is selected from polyether esters, monomeric ether esters, aliphatic polymeric esters, aromatic polymeric esters, polyesters, ester terminated poly butylene adipates, sulfonamides, and mixtures thereof.

10. A thermoplastic vulcanizate according to any one of embodiments 7-9, wherein the amount of plasticizer in the thermoplastic vulcanizate is from about 4 parts to about 35 parts, based on 100 parts by weight of the plastic and rubber phases.

11. A thermoplastic vulcanizate according to any one of embodiments 7-10, wherein the plasticizer is capable of functioning as a plasticizer for one or both of the plastic phase or rubber phase at the plastic melt temperature 12. A thermoplastic vulcanizate according to any one of embodiments 3-11, wherein the addition type curing agent is a multifunctional oxazoline or epoxide.

13. A thermoplastic vulcanizate according to any one of embodiments 3-12, wherein the thermoplastic vulcanizate comprises from about 0.5 part to about 15 parts, based on 100 parts by weight of the plastic and rubber phases, of the addition type curing agent.

14. A thermoplastic vulcanizate according one of embodiments 3-13 wherein the addition type curing agent is 2,2'-(1,3-phenylene)bis(2-oxazoline), or 2,2'-(1,4-phenylene)bis(2-oxazoline), or 2,2'-(2,6-pyridylene)bis(2-oxazoline), or mixtures thereof.

15. A thermoplastic vulcanizate according to embodiments 1 to 14 where greater than 80 weight percent of the rubber is crosslinked.

16. A thermoplastic vulcanizate according to any one of embodiments 1-14, wherein greater than 80 weight percent of the rubber is not soluble in a solvent that readily dissolves the un-crosslinked rubber.

17. A thermoplastic vulcanizate according to any one of embodiments 1-5 or 7-16, wherein the semi-crystalline engineering polyester is a poly (butylene terephthalate), poly (trimethylene terephthalate), poly (ethylene terephthalate), or mixture thereof.

18. A thermoplastic vulcanizate according to any one of embodiments 1-5 or 7-16 wherein the semi-crystalline copolyester elastomer comprises crystalline segments derived from poly(butylene terephthalate), and the elastomeric segments are derived from poly (dimethylene oxide), poly (trimethylene oxide), poly (tetramethylene oxide), or mixtures thereof, and the semi-crystalline copolyester elastomer has a hardness from about Shore D 70 to about Shore D 85.

19. A thermoplastic vulcanizate according to any one of embodiments 5-16, wherein the aliphatic polyamide is a polycaprolactam, polylaurolactam, poly(11-aminoundecanoic acid), a polyamide derived from hexamethylenediamine and adipic acid, poly(hexamethylene adipamide-co-caprolactam, or a mixture thereof.

20. A thermoplastic vulcanizate according to embodiment 17, wherein the plasticizer is an ester terminated poly (1,3-butylene adipate) and the thermoplastic vulcanizate comprises about 4 to 20 parts, based on 100 parts by weight of the plastic and rubber phases, of the plasticizer.

21. A thermoplastic vulcanizate according to embodiment 18, wherein the plasticizer is a diester terminated poly ethylene glycol or monomeric ether ester or aliphatic polymeric ester or aromatic polymeric ester, and the thermoplastic vulcanizate comprises about 4 to 35 parts, based on 100 parts by weight of the plastic and rubber phases, of the plasticizer.

22. A thermoplastic vulcanizate according to embodiment 19, wherein the plasticizer is N-(n-butyl)benzenesulfonamide and the thermoplastic vulcanizate comprises about 4 to 35 parts, based on 100 parts by weight of the plastic and rubber phases, of the plasticizer, or the plasticizer is methyl 4-hydroxybenzoate and the thermoplastic vulcanizate comprises about 4 to 20 parts of the plasticizer.

23. A thermoplastic vulcanizate according to any one of embodiments 1 to 22, wherein the nitrile rubber has a copolymerized nitrile content of about 15 to about 50 weight percent of the rubber, and the copolymerized acid crosslinking site is about 1 to about 10 weight percent of the rubber.

24. A thermoplastic vulcanizate according to any of embodiments 1-23, wherein the thermoplastic vulcanizate further comprises a cure accelerator selected from aryl phosphites, alkyl phosphites, aryl/alkyl phosphite, and mixtures thereof.

25. A gasket, tube, hose, seal, vibration dampener, stator, fitting, housing, case, film, shock absorber, anti-vibration mount, coupling, bushing, sleeve, or bellows, or foam comprising a thermoplastic vulcanizate according to any one of embodiments 1-24.

26. A tube or hose comprising at least one layer comprising a thermoplastic vulcanizate according to any one of embodiments 1-24.

27. A process for producing a thermoplastic vulcanizate comprising mixing a composition comprising a plastic phase and a rubber phase with an addition type curing agent,
wherein the mixing is carried out under conditions of shear and at a temperature above the melting point of the plastic phase, and wherein
the plastic phase comprises from about 35 parts to about 95 parts by weight, based on 100 parts by weight of the plastic and rubber phases, of a plastic having a melting point of about 160° C. to about 260° C., wherein the plastic is
a semi-crystalline engineering polyester,
a semi-crystalline copolyester elastomer, or
a semi-crystalline aliphatic polyamide, or mixtures thereof; and
the rubber phase comprises from about 65 parts to about 5 parts, by weight based on 100 parts by weight of the plastic and rubber phases, of a carboxylated nitrile rubber.

28. A process according to embodiment 27, wherein the rubber phase and the plastic phase are melt blended prior to the addition of the addition type curing agent.

29. A process according to embodiment 27, wherein the rubber phase and the plastic phase are melt blended while the addition type curing agent is added to the composition.

30. A process according to embodiment 27, wherein the process comprises:
prior to melt blending with the rubber, melt blending the plastic phase with a predetermined amount of addition type curing agent to form a blend of curing agent and plastic;
mixing the blend of curing agent and plastic with the rubber phase to form a blend of plastic phase and rubber phase.

31. A process according to embodiment 30, further comprising adding additional addition type curing agent to the blend of rubber phase and plastic phase with continued melt mixing.

32. A process according to embodiment 30, wherein the blend of curing agent and plastic is pelletized prior to mixing with the rubber phase.

33. A process according to any one of embodiments 27-32, wherein the maximum shear rate is less than 10,000 s$^{-1}$.

34. A process according to embodiment 27, where the composition is prepared by melt blending the plastic phase with the curing agent to form a plastic phase/curing agent blend, and melt blending the plastic phase/curing agent blend with the rubber phase.

35. A process according to any of embodiments 27-32, wherein the composition further comprises a cure accelerator selected from aryl phosphites, alkyl phosphites, aryl/alkyl phosphite, and mixtures thereof.

36. A process according to any one of embodiments 27-32, wherein the composition further comprises a cure accelerator selected from tris(2,4-di-t-butylphenyl) phosphite, bis(2,4-di-t-butylphenyl)pentaerythritol diphosphite, and mixtures thereof.

37. A process according to any of embodiment 35 or 36 wherein the cure accelerator is added to the mixture at any time during the process 38. A process according to any one of embodiments 27-37, wherein
the plastic phase comprises about 40 parts to about 70 parts by weight, based on 100 parts by weight of the plastic and rubber phases, of the plastic, and the plastic is
i) a semi-crystalline engineering polyester,
ii) a semi-crystalline copolyester elastomer, or a mixture thereof, and
the rubber phase comprises from about 60 parts to about 30 parts, by weight based on 100 parts by weight of the plastic and rubber phases, of the carboxylated nitrile rubber.

39. A process according to any one of embodiments 27-37, wherein
the plastic phase comprises about 70 parts to about 95 parts by weight, based on 100 parts by weight of the plastic and rubber phases, of the plastic, and the plastic is
i) a semi-crystalline engineering polyester,
ii) a semi-crystalline copolyester elastomer, or a mixture thereof; and
the rubber phase comprises from about 30 parts to about 5 parts, by weight based on 100 parts by weight of the plastic and rubber phases, of the carboxylated nitrile rubber.

40. A process according to any one of embodiments 27-37, wherein
the plastic phase comprises about 35 parts to about 95 parts by weight, based on 100 parts by weight of the plastic and rubber phases, of the plastic, and the plastic is a semi-crystalline aliphatic polyamide, and
the rubber phase comprises from about 65 parts to about 5 parts, by weight of the plastic and rubber phases, of the carboxylated nitrile rubber.

41. A process according to any one of embodiments 27-40, wherein a plasticizer selected from polyether esters, monomeric ether esters, aliphatic polymeric esters, aromatic polymeric esters, polyesters, ester terminated poly butylene adipates, sulfonamides and mixtures thereof, is introduced as plasticizer when convenient and appropriate during the process.

42. A process according to embodiment 41, wherein the plasticizer is added prior to, or after the mixing of a composition comprising a plastic phase and a rubber phase with an addition type curing agent, or split between the two addition points.

43. A process according to any one of embodiments 27-42, wherein the amount of the addition type curing agent is from about 0.5 part to about 15 parts, based on 100 parts by weight of the plastic and rubber phases.

44. A thermoplastic vulcanizate comprising a plastic phase, a rubber phase, and a plasticizer, wherein
a) the plastic phase comprises from about 40 parts to about 70 parts by weight, based on 100 parts by weight of the plastic and rubber phases, of a plastic having a melting point of about 160° C. to about 260° C., wherein the plastic is
i) a semi-crystalline engineering polyester,
ii) a semi-crystalline copolyester elastomer, or a mixture thereof; and
b) the rubber phase comprises from about 60 parts to about 30 parts, by weight based on 100 parts by weight of the plastic and rubber phases, of a carboxylated nitrile rubber;
c) an optional plasticizer, wherein the amount of plasticizer, when present, is from about 0 parts to about 35 parts, based on 100 parts by weight of the plastic and rubber phases; and
d) ester-amide crosslinks between reactive groups in the carboxylated nitrile rubber.

45. A thermoplastic vulcanizate according to embodiment 44, wherein the crosslinks are formed by a reaction between an oxazoline curing agent and reactive groups in the carboxylated nitrile rubber.

46. A thermoplastic vulcanizate according to embodiment 44 or embodiment 45, wherein the plasticizer is melt miscible with the rubber phase and the plastic phase.

47. A thermoplastic vulcanizate according to any one of embodiments 44-46, wherein the plasticizer is selected from polyether esters, monomeric ether esters, aliphatic polymeric esters, aromatic polymeric esters, polyesters, ester terminated poly butylene adipates, sulfonamides, and mixtures thereof.

48. A thermoplastic vulcanizate according to any one of embodiments 44-47, wherein the plasticizer is capable of functioning as a plasticizer for one or both of the plastic phase or rubber phase at the plastic melt temperature 49. A thermoplastic vulcanizate according to embodiment 44, wherein the oxazoline curing agent is a multifunctional oxazoline.

50. A thermoplastic vulcanizate according to any one of embodiments 44-49, wherein the thermoplastic vulcanizate comprises from about 0.5 part to about 15 parts, based on 100 parts by weight of the plastic and rubber phases, of the oxazoline curing agent.

51. A thermoplastic vulcanizate according one of embodiments 49-50, wherein the oxazoline curing agent is 2,2'-(1,3-phenylene)bis(2-oxazoline), or 2,2'-(1,4-phenylene) bis(2-oxazoline), or 2,2'-(2,6-pyridylene)bis(2-oxazoline), or a mixture thereof.

52. A thermoplastic vulcanizate according to embodiments 44-51 where greater than 80 weight percent of the rubber is crosslinked.

53. A thermoplastic vulcanizate according to any one of embodiments 44-51, wherein greater than 80 weight percent of the rubber is not soluble in a solvent that readily dissolves the un-crosslinked rubber.

54. A thermoplastic vulcanizate according to any one of embodiments 44-53 wherein the semi-crystalline engineering polyester is a poly (butylene terephthalate), poly (trimethylene terephthalate), poly (ethylene terephthalate), or mixture thereof.

55. A thermoplastic vulcanizate according to any one of embodiments 44-53 wherein the semi-crystalline copolyester elastomer comprises crystalline segments derived from poly(butylene terephthalate), and the elastomeric segments are derived from poly (dimethylene oxide), poly (trimethylene oxide), poly (tetramethylene oxide, or mixtures thereof, and the semi-crystalline copolyester elastomer has a hardness from about Shore D 70 to about Shore D 85.

56. A thermoplastic vulcanizate according to embodiment 54, wherein the plasticizer is an ester terminated poly (1,3-butylene adipate) and the thermoplastic vulcanizate comprises about 4 to 20 parts, based on 100 parts by weight of the plastic and rubber phases, of the plasticizer.

57. A thermoplastic vulcanizate according to embodiment 55, wherein the plasticizer is a diester terminated poly ethylene glycol or monomeric ether ester or aliphatic polymeric ester or aromatic polymeric ester, and the thermoplastic vulcanizate comprises about 4 to 35 parts, based on 100 parts by weight of the plastic and rubber phases, of the plasticizer.

58. A thermoplastic vulcanizate according to any one of embodiments 44-57, wherein the nitrile rubber has a copolymerized nitrile content of about 15 to about 50 weight percent of the rubber, and the copolymerized acid crosslinking site is about 1 to about 10 weight percent of the rubber.

59. A thermoplastic vulcanizate according to any of embodiments 44-58, wherein the thermoplastic vulcanizate further comprises a cure accelerator selected from aryl phosphites, alkyl phosphites, aryl/alkyl phosphite, and mixtures thereof.

60. A gasket, tube, hose, seal, vibration dampener, stator, fitting, housing, case, film, shock absorber, anti-vibration mount, coupling, bushing, sleeve, or bellows, or foam comprising a thermoplastic vulcanizate according to any one of embodiments 44-59.

61. A tube or hose comprising at least one layer comprising a thermoplastic vulcanizate according to any one of embodiments 44-59.

62. A thermoplastic vulcanizate comprising a plastic phase and a rubber phase, wherein
a) the plastic phase comprises from about 70 parts to about 95 parts by weight, based on 100 parts by weight of the plastic and rubber phases, of a plastic having a melting point of about 160° C. to about 260° C., wherein the plastic is
i) a semi-crystalline engineering polyester,
ii) a semi-crystalline copolyester elastomer, or a mixture thereof; and
b) the rubber phase comprises from about 30 parts to about 5 parts, by weight based on 100 parts by weight of the plastic and rubber phases, of a carboxylated nitrile rubber;
c) an optional plasticizer, wherein the amount of plasticizer, when present, is from about 0 parts to about 35 parts, based on 100 parts by weight of the plastic and rubber phases; and
d) ester-amide crosslinks between reactive groups in the carboxylated nitrile rubber.

63. A thermoplastic vulcanizate according to embodiment 62, wherein the crosslinks are formed by a reaction between an oxazoline curing agent and reactive groups in the carboxylated nitrile rubber.

64. A thermoplastic vulcanizate according to embodiment 62 or embodiment 63, wherein the plasticizer is melt miscible with the rubber phase and the plastic phase.

65. A thermoplastic vulcanizate according to any one of embodiments 62-64, wherein the plasticizer is selected from polyether esters, monomeric ether esters, aliphatic polymeric esters, aromatic polymeric esters, polyesters, ester terminated poly butylene adipates, sulfonamides, and mixtures thereof.

66. A thermoplastic vulcanizate according to any one of embodiments 62-65, wherein the amount of plasticizer in the thermoplastic vulcanizate is from about 4 parts to about 35 parts, based on 100 parts by weight of the plastic and rubber phases.

67. A thermoplastic vulcanizate according to any one of embodiments 62-66, wherein the plasticizer is capable of functioning as a plasticizer for one or both of the plastic phase or rubber phase at the plastic melt temperature 68. A thermoplastic vulcanizate according to embodiment 63, wherein the oxazoline curing agent is a multifunctional oxazoline.

69. A thermoplastic vulcanizate according to any one of embodiments 63-68, wherein the thermoplastic vulcanizate comprises from about 0.5 part to about 15 parts, based on 100 parts by weight of the plastic and rubber phases, of the oxazoline curing agent.

70. A thermoplastic vulcanizate according one of embodiments 63-69, wherein the oxazoline curing agent is 2,2'-(1,3-phenylene)bis(2-oxazoline), or 2,2'-(1,4-phenylene)bis(2-oxazoline), or 2,2'-(2,6-pyridylene)bis(2-oxazoline), or a mixture thereof.

71. A thermoplastic vulcanizate according to any one of embodiments 62-70 where greater than 80 weight percent of the rubber is crosslinked.

72. A thermoplastic vulcanizate according to a to any one of embodiments 62-70, wherein greater than 80 weight percent of the rubber is not soluble in a solvent that readily dissolves the un-crosslinked rubber.

73. A thermoplastic vulcanizate according to any one of embodiments 62-72, wherein the semi-crystalline engineering polyester is a poly (butylene terephthalate), poly (trimethylene terephthalate), poly (ethylene terephthalate), or mixture thereof.

74. A thermoplastic vulcanizate according to any one of embodiments 62-72 wherein the semi-crystalline copolyester elastomer comprises crystalline segments derived from poly(butylene terephthalate), and the elastomeric segments are derived from poly (dimethylene oxide), poly (trimethylene oxide), poly (tetramethylene oxide, or mixtures thereof, and the semi-crystalline copolyester elastomer has a hardness from about Shore D 70 to about Shore D 85.

75. A thermoplastic vulcanizate according to embodiment 73, wherein the plasticizer is an ester terminated poly (1,3-butylene adipate) and the thermoplastic vulcanizate comprises about 4 to 20 parts, based on 100 parts by weight of the plastic and rubber phases, of the plasticizer.

76. A thermoplastic vulcanizate according to embodiment 74, wherein the plasticizer is a diester terminated poly ethylene glycol or monomeric ether ester or aliphatic polymeric ester or aromatic polymeric ester, and the thermoplastic vulcanizate comprises about 4 to 35 parts, based on 100 parts by weight of the plastic and rubber phases, of the plasticizer.

77. A thermoplastic vulcanizate according to any one of embodiments 62-76, wherein the nitrile rubber has a copolymerized nitrile content of about 15 to about 50 weight percent of the rubber, and the copolymerized acid crosslinking site is about 1 to about 10 weight percent of the rubber.

78. A thermoplastic vulcanizate according to any of embodiments 62-77, wherein the thermoplastic vulcanizate further comprises a cure accelerator selected from aryl phosphites, alkyl phosphites, aryl/alkyl phosphite, and mixtures thereof.
79. A gasket, tube, hose, seal, vibration dampener, stator, fitting, housing, case, film, shock absorber, anti-vibration mount, coupling, bushing, sleeve, or bellows, or foam comprising a thermoplastic vulcanizate according to any one of embodiments 62-78.
80. A tube or hose comprising at least one layer comprising a thermoplastic vulcanizate according to any one of embodiments 62-78.
81. A thermoplastic vulcanizate comprising a plastic phase and a rubber phase, wherein
    a) the plastic phase comprises from about 35 parts to about 95 parts by weight, based on 100 parts by weight of the plastic and rubber phases, of a plastic having a melting point of about 160° C. to about 260° C., wherein the plastic is a semi-crystalline aliphatic polyamide; and
    b) the rubber phase comprises from about 65 parts to about 5 parts, by weight based on 100 parts by weight of the plastic and rubber phases, of a carboxylated nitrile rubber;
    c) an optional plasticizer, wherein the amount of plasticizer, when present, is from about 0 parts to about 35 parts, based on 100 parts by weight of the plastic and rubber phases; and
    d) ester-amide crosslinks between reactive groups in the carboxylated nitrile rubber.
82. A thermoplastic vulcanizate according to embodiment 81, wherein the crosslinks are formed by a reaction between an oxazoline curing agent and reactive groups in the carboxylated nitrile rubber.
83. A thermoplastic vulcanizate according to embodiment 80 or embodiment 81, wherein the plasticizer is melt miscible with the rubber phase and the plastic phase.
84. A thermoplastic vulcanizate according to any one of embodiments 81-83, wherein the plasticizer is selected from polyether esters, monomeric ether esters, aliphatic polymeric esters, aromatic polymeric esters, polyesters, ester terminated poly butylene adipates, sulfonamides, and mixtures thereof.
85. A thermoplastic vulcanizate according to any one of embodiments 81-84, wherein the plasticizer is capable of functioning as a plasticizer for one or both of the plastic phase or rubber phase at the plastic melt temperature
86. A thermoplastic vulcanizate according to embodiment 82, wherein the oxazoline curing agent is a multifunctional oxazoline.
87. A thermoplastic vulcanizate according to any one of embodiments 82-86, wherein the thermoplastic vulcanizate comprises from about 0.5 part to about 15 parts, based on 100 parts by weight of the plastic and rubber phases, of the oxazoline curing agent.
88. A thermoplastic vulcanizate according one of embodiments 86-87, wherein the oxazoline curing agent is 2,2'-(1,3-phenylene)bis(2-oxazoline), or 2,2'-(1,4-phenylene)bis(2-oxazoline), or 2,2'-(2,6-pyridylene)bis(2-oxazoline), or a mixture thereof.
89. A thermoplastic vulcanizate according to any one of embodiments 81-88 where greater than 80 weight percent of the rubber is crosslinked.
90. A thermoplastic vulcanizate according to any one of embodiments 81-88, wherein greater than 80 weight percent of the rubber is not soluble in a solvent that readily dissolves the un-crosslinked rubber.
91. A thermoplastic vulcanizate according to any one of embodiments 81-90, wherein the aliphatic polyamide is a polycaprolactam, polylaurolactam, poly(11-aminoundecanoic acid), a polyamide derived from hexamethylenediamine and adipic acid, poly(hexamethylene adipamide-co-caprolactam, or a mixture thereof.
92. A thermoplastic vulcanizate according to embodiment 91, wherein the plasticizer is N-(n-butyl)benzenesulfonamide and the thermoplastic vulcanizate comprises about 4 to 35 parts, based on 100 parts by weight of the plastic and rubber phases, of the plasticizer, or the plasticizer is methyl 4-hydroxybenzoate and the thermoplastic vulcanizate comprises about 4 to 20 parts of the plasticizer.
93. A thermoplastic vulcanizate according to any one of embodiments 81-92, wherein the nitrile rubber has a copolymerized nitrile content of about 15 to about 50 weight percent of the rubber, and the copolymerized acid crosslinking site is about 1 to about 10 weight percent of the rubber.
94. A thermoplastic vulcanizate according to any of embodiments 81-93 wherein the thermoplastic vulcanizate further comprises a cure accelerator selected from aryl phosphites, alkyl phosphites, aryl/alkyl phosphite, and mixtures thereof.
95. A gasket, tube, hose, seal, vibration dampener, stator, fitting, housing, case, film, shock absorber, anti-vibration mount, coupling, bushing, sleeve, or bellows, or foam comprising a thermoplastic vulcanizate according to any one of embodiments 81-94.
96. A tube or hose comprising at least one layer comprising a thermoplastic vulcanizate according to any one of embodiments 81-94.
97. A thermoplastic vulcanizate according to any of embodiments 1-24, 44-59, 62-78, or 81-94, wherein the rubber comprises particles.
98. A thermoplastic vulcanizate according to any of embodiments 1-24, 44-59, 62-78, or 81-94, wherein the rubber comprises particles having and average size diameter greater than 1 micrometer.
99. A thermoplastic vulcanizate according to embodiment 7, 44, 45, 62, 63, 81 or 82, wherein the plasticizer is melt miscible with the rubber phase but not the plastic phase, the plastic phase but not the rubber phase, or neither the rubber phase nor the plastic phase.
100. A thermoplastic elastomer comprising a plastic phase and a rubber phase, wherein
    a) the plastic phase comprises from about 35 parts to about 95 parts by weight, based on 100 parts by weight of the plastic and rubber phases, of a plastic having a melting point of about 160° C. to about 260° C., wherein the plastic is
        i) a semi-crystalline engineering polyester,
        ii) a semi-crystalline copolyester elastomer,
        iii) a semi-crystalline aliphatic polyamide, or a mixture thereof; and
    b) the rubber phase comprises from about 65 parts to about 5 parts, by weight based on 100 parts by weight of the plastic and rubber phases, of a carboxylated nitrile rubber; and
    c) an optional plasticizer, wherein the amount of plasticizer, when present, is from about 0 parts to about 35 parts, based on 100 parts by weight of the plastic and rubber phases.

What is claimed is:

1. A thermoplastic vulcanizate comprising a plastic phase and a rubber phase, wherein
   a) the plastic phase comprises from about 35 parts to about 60 parts by weight, based on 100 parts by weight of the plastic and rubber phases, of a plastic having a melting point of about 160° C. to about 260° C., wherein the plastic is a semi-crystalline engineering polyester,
   b) the rubber phase comprises from about 65 parts to about 40 parts, by weight based on 100 parts by weight of the plastic and rubber phases, of a carboxylated nitrile rubber having reactive carboxylate groups; and
   c) crosslinks the vulcanizate comprises formed by a reaction between an addition type curing agent and the reactive carboxylate groups in the carboxylated nitrile rubber, wherein the addition type curing agent is a compound comprising more than one oxazoline group.

2. A thermoplastic vulcanizate according to claim 1, wherein the addition type curing agent is 2,2'-(1,3-phenylene)bis(2-oxazoline), or 2,2'-(1,4-phenylene)bis(2-oxazoline), or 2,2'-(2,6-pyridylene)bis(2-oxazoline), or mixtures thereof.

3. A thermoplastic vulcanizate according to claim 1, wherein the addition type curing agent is 2,2'-(1,3-phenylene)bis(2-oxazoline).

4. A thermoplastic vulcanizate according to claim 1, wherein the addition type curing agent is 2,2'-(1,3-phenylene)bis(2-oxazoline) and the curing agent is present in an amount of about 1 to about 4 parts by weight for every 100 parts by weight of the carboxylated nitrile rubber and the plastic.

5. A thermoplastic vulcanizate according to claim 4, wherein the plastic phase comprises from about 50 parts to about 55 parts by weight, based on 100 parts by weight of the plastic and rubber phases, of the plastic, and the rubber phase comprises from about 50 parts to about 45 parts, by weight based on 100 parts by weight of the plastic and rubber phases, of the a carboxylated nitrile rubber.

6. A thermoplastic vulcanizate according to claim 5, wherein the addition type curing agent is 2,2'-(1,3-phenylene)bis(2-oxazoline) and the curing agent is present in an amounts of about 2 to about 3 parts by weight for every 100 parts by weight of the carboxylated nitrile rubber and the plastic.

7. A thermoplastic vulcanizate according to claim 6, wherein the plastic is a Poly(butylene terephthalate having a melting point of in the range of about 220° C. to about 230° C.

8. A thermoplastic vulcanizate according to claim 7, comprising a polyethylene glycol ester plasticizer.

9. A thermoplastic vulcanizate according to claim 5, wherein the addition type curing agent is 2,2'-(1,3-phenylene)bis(2-oxazoline) and the curing agent is present in an amounts of about 3 to about 5 parts by weight for every 100 parts by weight of the carboxylated nitrile rubber and the plastic.

10. A thermoplastic vulcanizate according to claim 9, wherein the plastic is a Poly(butylene terephthalate having a melting point of in the range of about 220° C. to about 230° C.

11. A thermoplastic vulcanizate according to claim 10, comprising a polyethylene glycol ester plasticizer.

12. A thermoplastic vulcanizate according to claim 5, wherein
   the plastic phase comprises from about 50 parts to about 55 parts by weight, based on 100 parts by weight of the plastic and rubber phases, of the plastic which is a Poly(butylene terephthalate having a melting point of in the range of about 220° C. to about 230° C.,
   the rubber phase comprises from about 50 parts to about 45 parts, by weight based on 100 parts by weight of the plastic and rubber phases, of the a carboxylated nitrile rubber; and the thermoplastic vulcanizate further comprises
   from 6 parts to 18 parts based on 100 parts by weight of the plastic and rubber phases of a polyethylene glycol ester plasticizer.

13. A thermoplastic vulcanizate comprising a plastic phase and a rubber phase, wherein
   a) the plastic phase comprises from about 70 parts to about 80 parts by weight, based on 100 parts by weight of the plastic and rubber phases, of a plastic having a melting point of about 160° C. to about 260° C., wherein the plastic is a semi-crystalline engineering polyester, and
   b) the rubber phase comprises from about 30 parts to about 20 parts, by weight based on 100 parts by weight of the plastic and rubber phases, of a carboxylated nitrile rubber having reactive carboxylate groups; and
   c) the vulcanizate comprises crosslinks formed by a reaction between an addition type curing agent and the reactive carboxylate groups in the carboxylated nitrile rubber, wherein the addition type curing agent is a compound comprising more than one oxazoline group.

14. A thermoplastic vulcanizate according to claim 13, wherein the addition type curing agent is 2,2'-(1,3-phenylene)bis(2-oxazoline) and the curing agent is present in an amounts of about 1 to about 5 parts by weight for every 100 parts by weight of the carboxylated nitrile rubber and the plastic.

15. A thermoplastic vulcanizate according to claim 14, wherein the plastic is a Poly(butylene terephthalate having a melting point of in the range of about 220° C. to about 230° C.

16. A thermoplastic vulcanizate according to claim 15, comprising a polyethylene glycol ester plasticizer.

17. A thermoplastic vulcanizate according to claim 13, wherein the addition type curing agent is 2,2'-(1,3-phenylene)bis(2-oxazoline) and the curing agent is present in an amounts of about 2 to about 5 parts by weight for every 100 parts by weight of the carboxylated nitrile rubber and the plastic.

18. A thermoplastic vulcanizate according to claim 17, wherein the plastic is a Poly(butylene terephthalate having a melting point of in the range of about 220° C. to about 230° C.

19. A thermoplastic vulcanizate according to claim 18, comprising a polyethylene glycol ester plasticizer.

20. A thermoplastic vulcanizate according to claim 13, wherein the thermoplastic vulcanizate further comprises
   from 6 parts to 18 parts based on 100 parts by weight of the plastic and rubber phases of a polyethylene glycol ester plasticizer.

* * * * *